US 11,475,575 B2

United States Patent
Bentley et al.

(10) Patent No.: US 11,475,575 B2
(45) Date of Patent: Oct. 18, 2022

(54) APPARATUS AND METHOD FOR MEASURING HAIR MOVEMENT CHARACTERISTICS

(71) Applicant: Conopco, Inc., Englewood Cliffs, NJ (US)

(72) Inventors: Christopher David Bentley, Bebington Wirral (GB); Llyr Glyndwr Griffiths, Bebington Wirral (GB); Eric Gordon Mahers, Bebington Wirral (GB); Julie Marie Roberts, Bebington Wirral (GB); Graham John Cleaver, Bromborough Wirral (GB); Aneta Magdalena Stasik, Liverpool (GB); James Steven Cowan, Wirral Merseyside (GB); Geoffrey Francis Lawton, Bebington Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 16/623,158

(22) PCT Filed: Jun. 20, 2018

(86) PCT No.: PCT/EP2018/066479
§ 371 (c)(1),
(2) Date: Dec. 16, 2019

(87) PCT Pub. No.: WO2018/234410
PCT Pub. Date: Dec. 27, 2018

(65) Prior Publication Data
US 2021/0142486 A1 May 13, 2021

(30) Foreign Application Priority Data
Jun. 23, 2017 (EP) .................................. 17177721

(51) Int. Cl.
*G06T 7/20* (2017.01)
(52) U.S. Cl.
CPC ...................................... *G06T 7/20* (2013.01)
(58) Field of Classification Search
CPC ........... G06T 7/20; G06T 7/00; G06T 7/0002; G06T 7/0004; G06T 7/0006;
(Continued)

(56) References Cited

U.S. PATENT DOCUMENTS 8,428,382 B2 * 4/2013 Sato ..................... A45D 44/005
382/254
2015/0072332 A1 3/2015 Lin et al.
2016/0260062 A1 * 9/2016 Ellington ............ G06F 16/9535

FOREIGN PATENT DOCUMENTS

EP 2124185 11/2009
WO WO2017072009 5/2017

OTHER PUBLICATIONS

Galliano et al.; Evaluation of hair movement, as a new insight for its visual perception (Abstract); IFSCC 2014; Jan. 1, 2014; pp. 1-2; XP055400432; abstract only.

(Continued)

*Primary Examiner* — Michael E Teitelbaum
(74) *Attorney, Agent, or Firm* — Gerard J. McGowan, Jr.

(57) ABSTRACT

An apparatus for measuring movement characteristics of a first hair switch includes a movement rig, a camera, and a computer. The first hair switch is mountable on the movement rig. The movement rig is operable to apply a forced oscillation to the first hair switch. The camera is for capturing images of the first hair switch during movement of the first hair switch during and after application of the forced oscillation. The computer is communicably connected to the camera. The computer includes a processor for processing the images and extracting quantitative measurements of the first hair switch from the images. A filter is applied to the (Continued)

images to remove any stray hairs detected before subsequent analysis of the images is carried out.

13 Claims, 17 Drawing Sheets

(58) Field of Classification Search
CPC ..... G06T 7/0008; G06T 7/001; G06T 7/0012; G06T 7/0014; G06T 7/0016; G06T 7/12; G06T 7/62; G06T 2207/30108
See application file for complete search history.

(56) References Cited

OTHER PUBLICATIONS

Galliano et al.; Evaluation of hair movement as a new insight for its visual perception; IFSCC 2014; Jan. 1, 2014; pp. 1-16; XP0550400422.

Jakob et al.; Capturing Hair Assemblies Fiber by Fiber; Papers on ACM Siggraph Asia 2009; Dec. 1, 2009; pp. 1-9; XP058103955.
Search Report and Written Opinion in PCTEP2018066479.
Wenzel Jakob et al.; Capturing hair assemblies fiber by fiber; ACM Transactions on Graphics; 2009; pp. 164:1-164:9; XP055263403; XP058103955; vol. 28, No. 5; ACM Pres.
A. Galliano et al.; Analysing the movement of a hair swatch using video and image analysis: A promising technique for exploring the dynamic properties of hair; International Journal of Cosmetic Science; 2015; pp. 56-62; XP055399442; vol. 37, No. 1.
A. Galliano et al.; Evaluaion of Hair Movement, As a New Insight of its Visual Perception; IFSCC; 2014; pp. 1-2 (Abstract); XP055400432; http://www.congress.loreal.com/2014-ifscc/2014-01-28_abstract.pdf.
Galliano et al.; Evaluation of hair movement as a new insight for its visual perception; IFSCC Product Performance Evaluation L'Oreal Research and Innovation; 2014; pp. 1-16; XP055400422 http://www.congress.loreal.com/2014-ifscc/2014-10-30_IFSCC_presentation.pdf.

\* cited by examiner

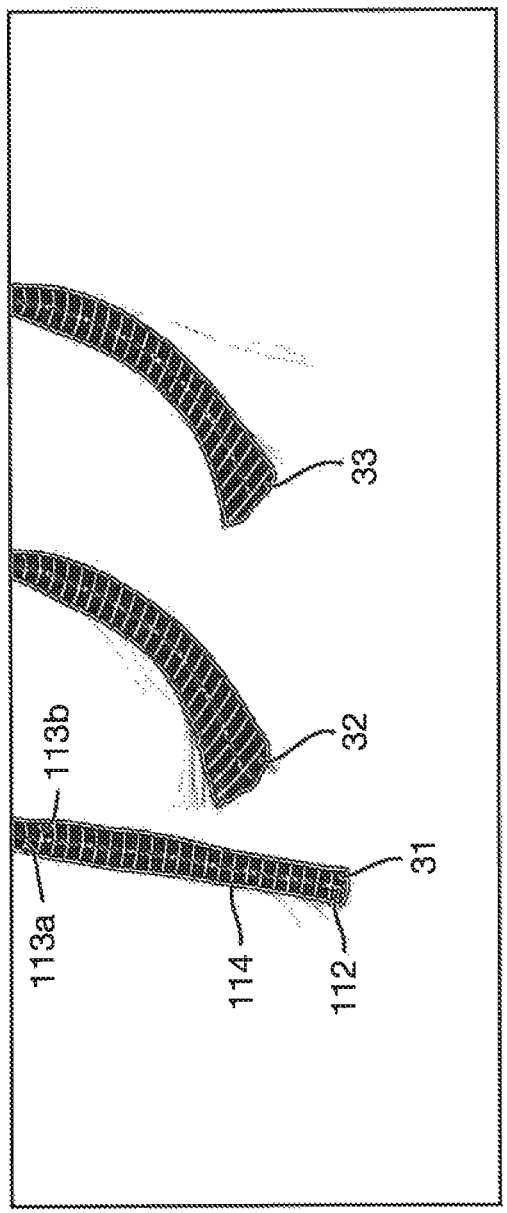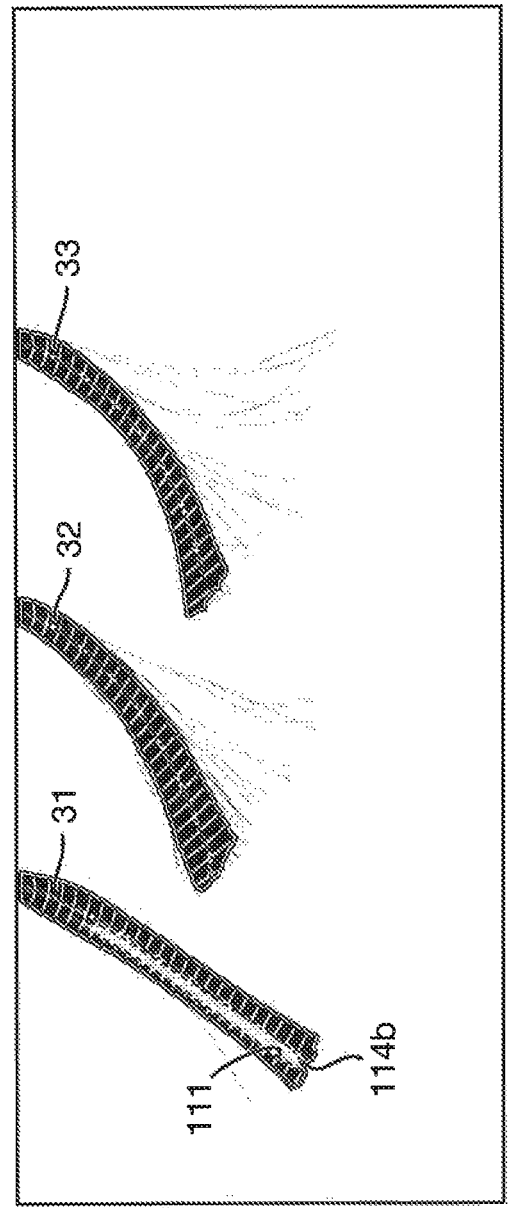

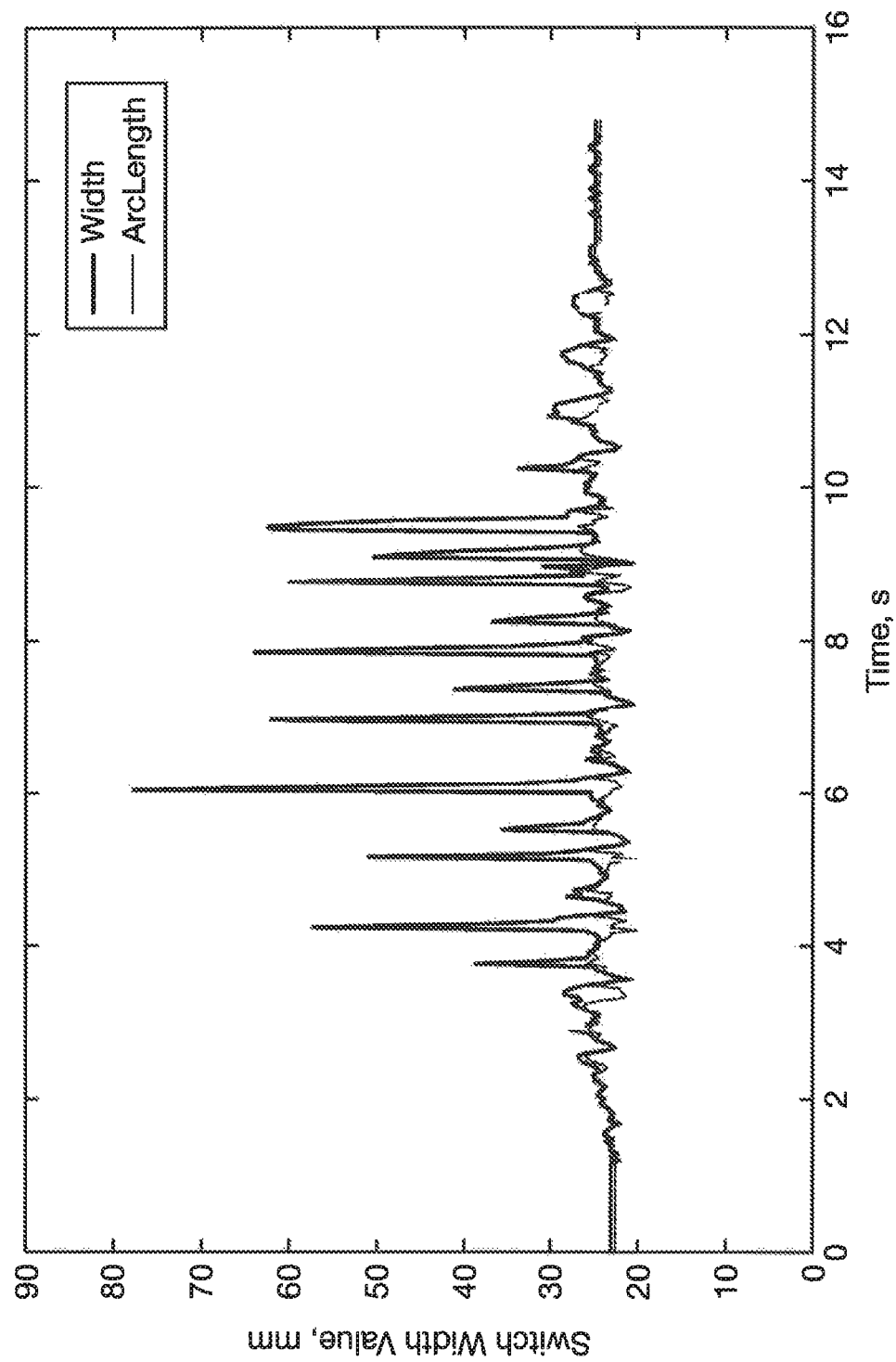

APPARATUS AND METHOD FOR MEASURING HAIR MOVEMENT CHARACTERISTICS

CROSS-REFERENCE TO RELATED APPLICATIONS

This application claims priority to International Patent Application No. PCT/EP2018/066479, filed on Jun. 20, 2018, and European Patent Application No. 17177721.2, filed on Jun. 23, 2017, both of which are incorporated herein by reference in their entireties.

TECHNICAL FIELD

The present disclosure relates to an apparatus and method for measuring movement characteristics of hair, particularly to measurements relating to movement and bounce of hair, particularly both during and after application of a forced oscillation to the hair.

BACKGROUND

The way in which hair moves has long been a point of interest for consumers and manufacturers of hair products, alike. Generally, a natural movement or bounce of the hair is desirable. Increasingly, hair products such as shampoo, conditioners, hair treatments and styling products are being sold along with claims that they deliver improvements to the movement and/or bounce of the hair.

However, unlike other hair parameters such as thickness or shine, determination of movement or bounce, to date, generally relies upon qualitative analysis of movement, which is based on consumer perception rather than on technical data.

With hair movement attributes becoming ever more important to consumers, there is a need to provide an improved mechanism for assessing these hair movement characteristics in a reliable and reproducible way.

Galliano et al, *International Journal of Cosmetic Science*, Vol 37, No 1, February 2015, pages 56-62, describes an instrumental evaluation method of hair movement in order to propose new criteria in the performances of hair products. The method consists of a video acquisition system with fast cameras. The in vitro evaluation of hair swatch movement allows better understanding of the phenomena that appear when various hair care and styling technologies are applied upon the mechanisms of hair movements.

Similarly, Galliano et al, IFSCC 2014, 2014 pages 1-2 and pages 1-16 describes an evaluation of hair movement as a new insight for its visual perception. A five digital-camera in-vitro method allows the 'move Hair 3D' video acquisition. It allows two types of movement of hair to be simulated: a continuous motion and a damping mode. For different frequencies, various forms of movement are observed, from a simple pendulum to a more complex rotating motion in 3 dimensions. Through analysis of changes in these different parameters, the impact of hair products can be assessed and more adequate formulas can be developed.

US2015/072332A1 describes an apparatus and methods for generating a forced-choice assessment test for a subject, the test comprising a sequence of item blocks, each item block comprising a plurality of items to which the subject is required to respond. The scheme is based on Thurstonian Item-Response.

SUMMARY

Accordingly, the present disclosure aims to solve the above problems by providing, according to a first aspect, an apparatus for measuring movement characteristics of a hair switch, the apparatus comprising: a movement rig upon which the hair switch is mountable, the movement rig operable to apply a forced oscillation to the hair switch; a camera for capturing images of the hair switch during movement of the hair sample during and after application of the forced oscillation; and a computer communicably connected to the camera, the computer including a processor for processing the captured images and extracting quantitative measurements of the hair switch from the captured images, characterised in that a filter is applied to the captured images to remove any stray hairs detected before subsequent analysis of the images is carried out.

Generally, the switch may move as a main body of hair. However, stray hairs or small bundles of hairs may become detached from the main body of the hair. The existence of such stray hairs or small bundles of hairs (otherwise known as "flyaways") away from the main body of the hair switch is identified. The present disclosure is configured to apply a filter to exclude such detached stray hairs or small bundles of hairs from further analysis by ignoring them, thus excluding flyways in further analysis of the associated hair switch. In other words, a filter is applied to the captured images to exclude any stray hairs detected before subsequent analysis of the images is carried out. The filter operates on the images to locate the outline of the hair switch, where the outline at least partially excludes stray fibres ("flyaways") that are located away from the main body of the hair switch. Ignoring flyaways in this way may improve hair spine location.

The filter may take the form of a minimum length ratio. The minimum length ratio may be a minimum value of the ratio of the length of a radius to the length of the switch. By excluding hairs that exceed such a minimum length ratio it is possible to exclude hairs that are widely separated from the main body of the switch (i.e. flyaways). Any hairs detected in the image which lie outside of this minimum length ratio may be considered to be spurious and ignored during subsequent analysis, which may include the determination of any one or more of the quantitative measurements mentioned above.

A second option for the filter may be an intensity threshold in the image. Stray fibres may typically have a lower intensity in the image, and consequently by applying an intensity threshold below which portions of the image are ignored, it is possible to implement a stray fibre filter.

A filter may comprise an intensity threshold component and a minimum length ratio component.

Optional features of the present disclosure will now be set out. These are applicable singly or in any combination with any aspect of the present disclosure.

In some embodiments, two or more hair switches are mountable to the movement rig, wherein the same forced oscillation is applied simultaneously to the two or more hair switches.

In this way, the apparatus provides both a mechanism for quantitative measurements of each individual hair switch, but for also comparative measurements (both quantitative and qualitative) between the two or more switches. Each of the two or more switches may be treated with different hair products before the measurements take place. Accordingly, the apparatus enables quantitative comparisons of the effects on the bounce and movement of the hair switches arising as a result of the hair products used. Hair products applied to the hair switches may include one or more of: shampoo, conditioner, hair treatments, and hair styling products, for example.

The quantitative measurements may include one or more of: x amplitude; y amplitude; relative phase between the top and bottom of the hair switch; decay time; natural frequency; 2D area of the hair switch; change of 2D area of hair switch between before movement and after movement. Quantitative measurements of the 2D area of the hair switch, and how it changes during the steady state of movement, are also made. For example, minimum, maximum and average volume of the hair switch during steady state movement may be measured.

The measurement of X amplitude is a measurement of how far the hair switch moves in the horizontal, X axis.

The measurement of Y amplitude is a measurement of how far the hair switch moves in the vertical, Y axis.

The relative phase is a measurement of the difference in movement between the top and bottom of a given hair switch.

The decay time is the time taken for the hair switch to come to rest after the forced oscillation has been stopped.

The natural frequency is a measurement of the speed at which the hair switch moves (in the x and/or the y direction) after excitation by the forced oscillation is stopped.

The 2D area of the hair switch as viewed by the camera (i.e. the total volume in the image plane).

The change in 2D area of the hair switch before and after movement may also be referred to as the change in volume of the hair switch. In other words, the difference in volume of the hair switch as viewed by the camera, before and after movement, may be measured.

In some embodiments, the computer comprises an input for receiving consumer modelled data based upon consumer studies carried out using the hair switch(es).

This consumer modelled data received may typically take the form of a consumer perception value, "d prime" (d'), calculated by applying a Thurstonian model, or other latent variable model, to the consumer perception of relative differences between two or more hair switches for a particular hair attribute. The Thurstonian model is a latent variable model which maps the consumer impressions (from consumer studies) e.g. the consumer's impressions as to which sample of hair has the best "bounce", onto discrete ordered categories of response. Thurstonian models are known to provide a mechanism for sensory discrimination tasks.

The raw data obtained from consumer groups may relate to one or more different attributes of the hair, examples of which include:
  Bounce
  Lightweight movement
  Fluid movement
  Controlled movement These attributes are terms that are commonly used with respect to the movement of hair, and common terms used by consumers in the description of hair movement characteristics. In performing consumer studies no formal definitions of these attributes were provided to the consumers. It will be appreciated that differences in individuals' understanding and assessment of a given attribute are reduced by considering a larger population of consumers.

As described below, a predicted attribute value is generated for a given attributed is based on a model that has been created on the basis of consumer data related to that same attribute. For example, a predicted performance for the "bounce" attribute will be based on a "bounce" model that had, during its creation, consumer modelled data related to "bounce". In some embodiments, upon receiving quantitative measurements of a hair switch, the processor applies a cross-validated model which combines the quantitative measurements of the hair switches used in model generation with the consumer modelled data (which comes from consumer studies of the same hair switches that have been used for the cross-validated model generation).

The cross validated model provides a correlation between the quantitative measurements of a set of hair switches and consumer perception values for the same set of switches. It will be appreciated that a number of modelling methods may be suitable for modelling such correlations. One example of a cross validated model is a partial least squares (PLS) model, which correlates quantitative measurements derived from the captured images with the consumer perception values (d') extracted from the consumer modelled data.

A particular cross-validated model may include a number of attribute models. Each attribute model may itself be a cross-validated model in respect of a single particular movement attribute. For example, a particular cross-validated model may include an attribute model for each of bounce, lightweight movement, fluid movement, and controlled movement.

In some embodiments, the processor is further configured to apply a predictive model to new hair switches (i.e. hair switches not used in generating the cross-validated model).

The predictive model may be based upon the cross-validated model. The predictive model can be used to analyse lab measurements of new data (i.e. quantitative measurements of new hair switches) and predict consumer responses based upon the predictive model, which in turn is based upon the cross-validated model(s).

In this way, the apparatus uses lab-based data in the form of cross-validated models to predict a consumer response, thereby enabling the benefits of a consumer study to be achieved without the need to set up and conduct expensive and time consuming consumer studies. In other words, the earlier consumer studies used to produce the cross-validated models act as a calibration tool, such that consumer responses can be predicted for later measurements of hair switches taken on a movement rig.

According to a second aspect of the present disclosure, there is provided a method of measuring movement characteristics of a hair switch, the method comprising the steps of:
  providing a movement rig upon which the hair switch is mountable, the movement rig operable to apply a forced oscillation to the hair switch;
  providing a camera for capturing images of the hair switch during movement of the hair sample during and after application of the forced oscillation;
  providing a computer communicably connected to the camera, the computer including a processor;
  processing the captured images at the processor; and
  extracting quantitative measurements of the hair switch from the captured images,
  characterised in that a filter is applied to the captured images to remove any stray hairs detected before subsequent analysis of the images is carried out.

The optional features described above in relation to the apparatus of the first aspect may all be applied to the method of the second aspect. In particular:

The method may further comprise the step of: receiving at an input of the computer, consumer modelled data based upon consumer studies carried out using the hair switch(es). The consumer modelled data received is typically a consumer perception value, d prime (d'), calculated by applying a Thurstonian model to the consumer perception of relative differences between two or more hair switches.

Upon receiving consumer modelled data, the processor may generate a cross-validated model which combines the quantitative measurements of the hair switches from the captured images with the consumer modelled data. Optionally, the cross-validated model is a partial least squares model which correlates the quantitative measurements from the captured images with the consumer perception values (d') extracted from the consumer modelled data.

The method may further comprise the step of applying a predictive model based upon the cross-validated model to quantitative measurements taken from new sets of hair switches, the predictive model predicting consumer responses to the new sets of hair switches based upon the cross-validated models.

According to a third aspect of the present disclosure, there is provided a computer program product comprising instructions which, when the program is executed by a computer, and provided in combination with the movement rig and camera of the first and second aspect, causes the computer to carry out the remaining steps of the method of the second aspect.

Further optional features of the present disclosure are set out below.

BRIEF DESCRIPTION OF THE DRAWINGS

Embodiments of the present disclosure will now be described by way of example with reference to the accompanying drawings in which:

FIG. 10A and 10B show two examples of image analysis carried out on the three hair switches of FIG. 9;

FIG. 16 shows an example of arc length and width as a function of time for a single switch.

DETAILED DESCRIPTION AND FURTHER OPTIONAL FEATURES OF THE PRESENT DISCLOSURE

Figure 1:
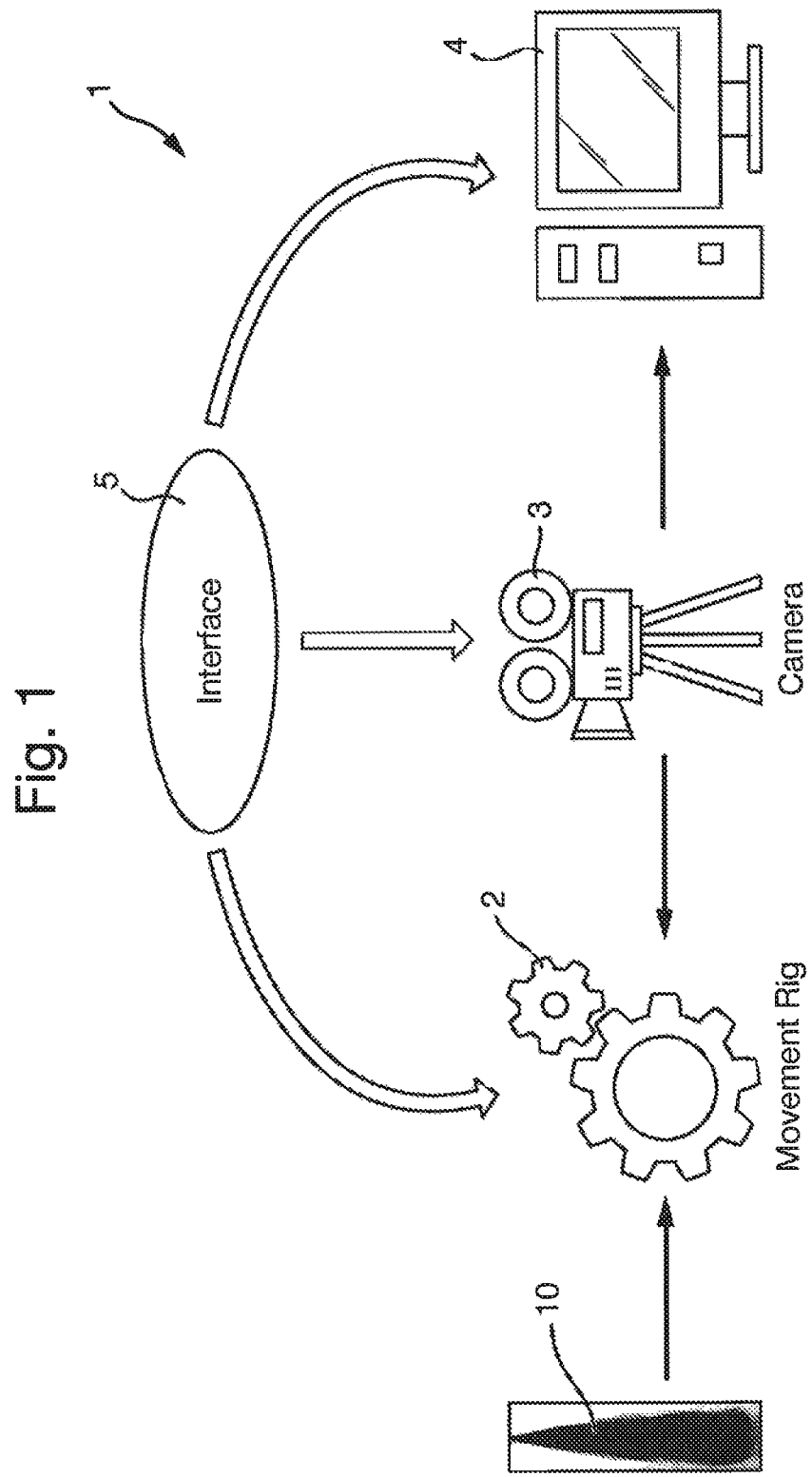
FIG. 1 shows a schematic diagram of an apparatus according to the present disclosure.

The apparatus of the present disclosure is configured to measure characteristics of movement of one or more hair switches as described below in more detail with reference for FIGS. 1, 2 and 3. These characteristics (also known as "movement parameters") may include quantitative measurements of: x amplitude; y amplitude; relative phase between the top and bottom of the hair switch; decay time; frequency; 2D area of the hair switch, and; change on 2D area before and after movement.

The apparatus of the present disclosure is also configured to apply a filter to exclude stray fibres located away from the body of the hair switch from further analysis by ignoring them. The measured movement characteristics can, in turn, be used to deduce attributes of hair movement such as: bounce, lightweight movement, fluid movement and controlled movement for the one or more hair switches 10, 10a, 10b. A number of other attributes of hair movement may be also be defined. For example, Flexibility during movement;
Keeping shape/style/alignment during movement;
Less "weighed down" during movement;
Lightweight movement, and;
Lively movement.

Such attributes may be applicable in a number of different countries (for example, UK, US, China, Japan, Indonesia, India, Thailand and Brazil). Of course, attributes could equally be useful in all countries Some other attributes may be particularly applicable for consumers in particular countries. For example, Weighty (in Thailand);
Sa-Luay (in Thailand);
Flows beautifully/naturally (in Thailand);
Moves with vitality (in Indonesia), and;
Sarasara sensory (in Japan).

The apparatus 1 includes a movement rig 2 upon which the hair switch is mountable. Typically, this includes a bar (not visible in FIG. 2) which includes multiple switch holders, each switch holder for engaging the top of a respective hair switch. The movement rig includes a motor which applies an oscillatory force (the forced oscillation) in the horizontal axis to the bar, causing it to undergo an oscillating movement in the direction denoted "x".

It will be appreciated that the oscillation frequency can take a range of suitable values. For example, a suitable range may be 0.8 to 1.3 Hz. There may be lower frequency, below which oscillatory movement of the switch is not induced, rather the whole switch moves rigidly with the forced oscillation. There may an upper frequency, above which undesirable movements of the hair switch are induced (for example, twisting movements). A preferred oscillation frequency of the bar may be 1.0Hz. Equally, the oscillation frequency could be a different, suitable, value. It will be appreciated that a number of factors are important in determining the forced oscillation frequency, there may be no strict limits to the forced oscillation frequency. By attaching all hair switches to the single bar, any movement of the bar will cause the same force of movement to be applied to each mounted hair switch 10a, 10b.

The forced oscillation frequency used when making the quantitative measurements of the hair switches used in the generation of the cross validated model may be identical to the forced oscillation frequency used for the quantitative measurements of hair switches used as an input to the corresponding predictive model.

Figure 2:
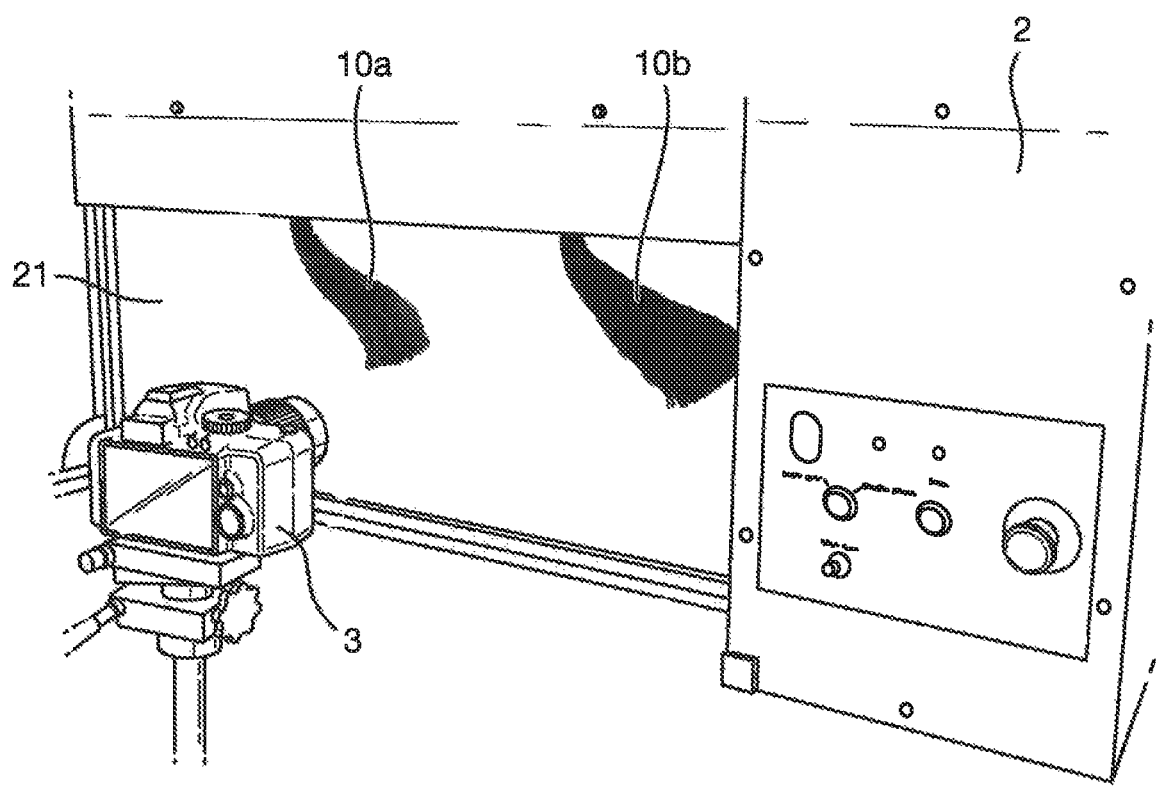
FIG. 2 depicts the movement rig and camera of the apparatus in more detail.

In the embodiment shown in FIG. 2, the bar is located in front of a lightbox 21. A camera 3, specifically a camera with video capabilities, is mounted at a fixed distance from the lightbox 21 for capturing images of the hair samples (via frames of a video), not only during the initial excitation and the time at which the bar is oscillating (and where the mounted hair switches therefore undergo steady state movement); but also for a period of time after the bar has finished oscillating, where the mounted hair switches undergo motion decay. In this way, the camera is able to capture images of the hair movement during forced oscillation; but also, images of the decay of movement after the forced oscillation has ceased to be applied.

The images may be obtained from a video that is recorded using the camera. The images are extracted from the video. Each image may correspond to a frame of the video. Re-analysis of the images from a particular video may also be possible without having to re-extract the images from the video. In other words, the images may be extracted from the video only once, and then stored. The stored images are then available for analysis without having to repeat the step of extracting the images from the video.

A delay may be applied between the start of recording by the camera 3, and the start of forced oscillation movement by the movement rig 2. As an example, this delay may have a magnitude of 1 second or more; the motion run time during which the bar is oscillated may have a duration of 7 seconds or more; and the delay between the stop of forced oscillation (by stopping the movement of the bar) and the time at which the camera stops capturing images, may have a value of 6 seconds or more. It will be appreciated that these time periods are examples only.

The apparatus 1 further comprises a computer 4 which is communicably connected to the camera 3, the computer including a processor for processing the images and/or videos captured by the camera 3, and for extracting quantitative measurements of the hair switch from the captured images.

The computer 4, camera 3 and movement rig 2 may be interfaced via an interface 5 such as a wireless network. In this way, programs running on the computer may also be used to control the movement rig and camera, in particular start and stop times.

The measurement and analysis software run by the processor to process the images and extract measurements may be written on any suitable platform, such as Exelis IDL version 8.3 or later versions, an important feature being the inclusion of a function such as the IDL function IDLffVideoRead, which performs conversion of the video files obtained into images. The presence of purpose built software for image analysis functions such as the IMF_ImageAnalysis library in Exelis IDL version 8.4 may also be advantageous.

Suitable cameras include, but are not limited to the Nikon D90, Nikon D5000 and Nikon D3200 cameras. Cameras such as the D3200 were found to be particularly advantageous as they enable the user to set the shutter speed in manual video mode. Shutter speeds of 1/500s and 1/1000s were tested and both worked well, with 1/1000s performing particularly well. Cameras such as the D90 and D5000, which do not allow for variable shutter speed when taking videos may result in motion blur, which makes the switch outline more indistinct and subsequent measurements obtained less accurate. It will be appreciated that these cameras are examples only, and many other cameras may be capable of the technical performance detailed herein.

The maximum video frame rate for the D3200 was 25 frames per second progressive scan (25p) with image size of 1920 by 1080. Higher frame rates that are only available at lower spatial resolution Interlaced video modes, such as 50i, should be avoided, because they are composed of two separate exposures interlaced together and the motion between exposures may create a double image.

As well as measurement and analysis of a single hair switch, measurements and analysis can be carried out by the software on multiple switches 10a, 10b, which are simultaneously mounted on the movement rig. In the case of multiple switches, the number of switches may form an input to the software, and the software will try to find in the images the number of switches input to the software. The apparatus may be configured to give an error if the specified number of switches cannot be identified within the field of view of the camera.

The apparatus also includes a calibration disc (not shown) located within the field of view of the camera. The calibration disc has a known size, thereby providing a mechanism for calibrating the pixels of the captured images into real space measurements.

Figure 3:
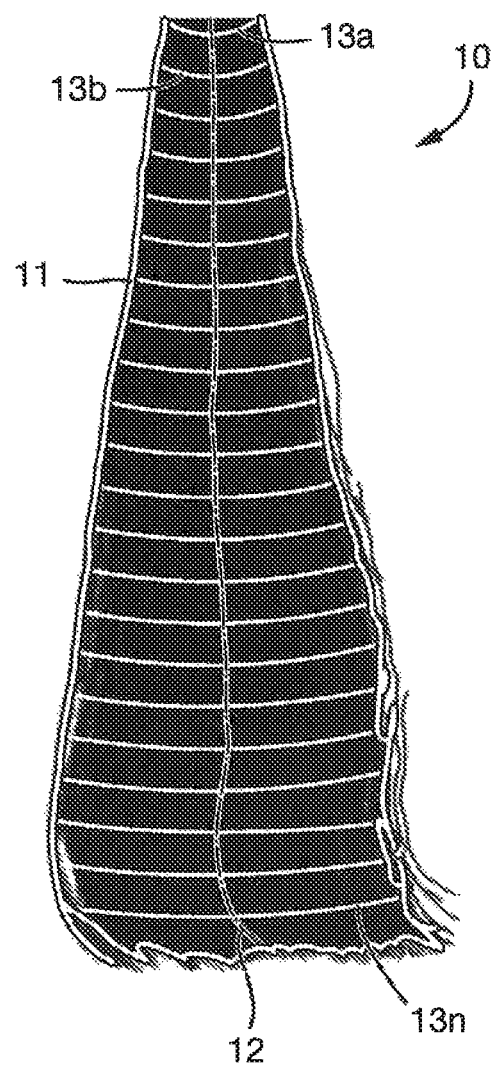
FIG. 3 depicts a captured screenshot image of a hair switch in motion, the captured image being analysed to obtain quantitative measurements of the hair switch.

An example of a captured image of a hair switch is shown in FIG. 3, the captured image being analysed to obtain quantitative measurements of the hair switch. Initially, for each hair switch in the image, the software extracts the switch outline 11 and the spine 12 of the hair switch. The software then analyses the movement parameters at multiple equally spaced radii 13a, 13b ... 13n along the length of the switch. In the example shown, the spacing between adjacent radii is 10mm.

Equations used to analyse the motion of a particular hair switch are set out below for each of the steady state (forced oscillation) (equation (1) and the decay time (equation (2)) (after forced oscillation).

Steady state:

$$x = A \sin\left(\frac{2\pi t}{\lambda} + \frac{\pi \varphi}{180}\right) + B \quad (1)$$

Decay state $$x = A \sin\left(\frac{2\pi t}{\lambda} + \frac{\pi \varphi}{180}\right) e^{\frac{-(t-T_2)}{\tau}} + B \quad (2)$$

where:

x is the horizontal location of the crossing point of the spine and a particular radius in mm;

A is the amplitude in mm;

t is the time in seconds;

$T_2$ is the time in seconds when the forced motion is stopped;

$\lambda$ is the wavelength in seconds;

$\varphi$ is the phase angle in degrees;

$\tau$ is the motion decay time constant in seconds;

B is the offset in mm.

The modelled mathematical form of motion in the x-direction is sinusoidal (as above). The root-mean-squared (RMS) value of the sinusoidal motion described above is RMS=A/sqrt (2). The RMS is equal to the standard deviation of the x-values, which means that the amplitude, A=sqrt(2)*standard deviation(x_position values).

For motion in the y-direction, the Amplitude of the y-direction motion is calculated as A_y=sqrt (2)*standard deviation(y_position values).

Measurement and analysis steps carried out by software run on the processor of the computer are described in more detail below with reference to FIGS. 4 to 9.

Figure 4:
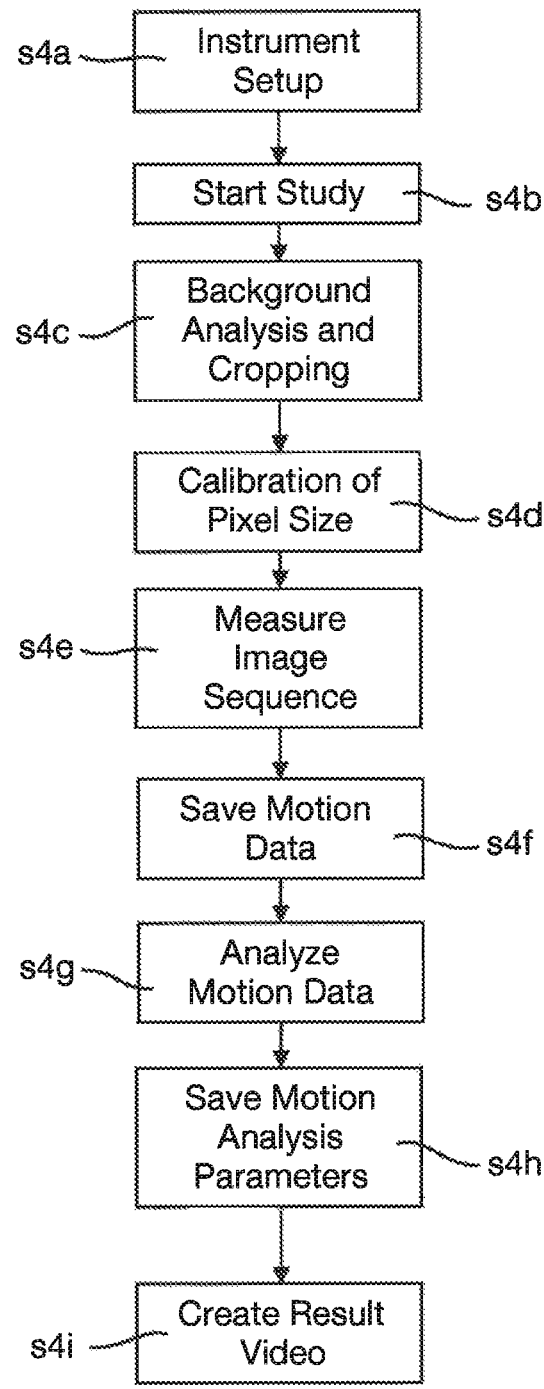
FIG. 4 shows an overview of the method of obtaining quantitative measurements using the measurement rig.

FIG. 4 shows an overview of an example of a method of obtaining quantitative measurements using the measurement rig.

In an initial instrument setup step s4a the apparatus is provided as described above in relation to FIGS. 1 and 2. In finer detail, one or more of the following sub-steps are carried out.

Parameters to be used during measurement are loaded or defined by the software. Such parameters may include: Motion speed, Motion amplitude, Motion Start time, Motion End time, Motion Decay time, video frame rate, video width and height, video shutter speed and lens aperture, number of switches, number of cycles of forced oscillation to ignore before start of Steady State region, Switch measurement radial separation (mm), maximum radius (mm) and/or Calibration disc size (mm);

Instrumental set up includes setting the focus the camera such that it is focused on each of the one or more hair switches to be analysed.

A short video of the background is captured and converted to a single image, typically labelled as "Background" and a short video of the calibration disc is captured and converted to a single image, typically labelled "Calibration".

In a subsequent step s4b, the study is started. This includes entering switch details, such as the number of switches. The type of each hair switch and treatments applied to each of the hair switches may also be noted. The video capture of hair switch or switches is started at start time T0; T0 is noted.

The forced oscillation motion of the bar is started, the time of starting the oscillation motion relative to T0, TS, is noted.

The forced oscillation motion of the bar is stopped, and the stop time TE, relative to T0, is noted.

After a given period of time from TE, which is chosen to capture the decay of motion of the hair switch(es), the video recording is stopped.

In subsequent steps s4c and s4d, background analysis, cropping, and calibration of the captured images are carried out. This includes: converting the video file of the background to a single background image, converting the video file of calibration disc to a single calibration disc image, and extracting from the video file of switch motion a sequence of images for analysis.

The lightbox region in the background image is identified by identifying crop coordinates, which correspond to the lightbox region s4c.

To calibrate the pixel size from the calibration disc image s4d, the calibration disc is identified in the calibration disc image. The known size of the calibration disc is used to calculate pixel size in the real-world.

In a subsequent step, the image sequence of the desired switch(es) forced movement and decay is measured. The cropped/calibrated images may be stored.

In a subsequent step, s4f, the motion data obtained is stored.

Motion data is then analysed s4g, including the following analysis steps:
- Determining the start of motion time, T1 using top of switch motion data together with TS and TE;
- Determining the end of motion time, T2, using top of switch motion data together with TS and TE;
- Fitting a sine wave to top of switch data, returning $A_0$, $\lambda_0$, $\varphi_0$ and $B_0$;
- Determining the start of steady state region, using motion start time, fit and Nc, where Nc is the number of cycles of oscillation at the start of the forced oscillation that are to be ignored before starting the steady state region.
- Determining the end of steady state region and the start of the decay region, corresponding to T2;
- Fitting sine waves to each radius switch data between T1 and T2, and returning $A_i$, $\lambda_i$, $\varphi_i$ and $B_i$; each point that is fitted corresponds to an intersection of the spine and a respective radius;
- Fitting decaying sine waves to each radius switch data between T2 and TE, and returning motion analysis parameters $A_i$, $\lambda_i$, $\varphi_i$, $\tau_i$ and $B_i$; each point that is fitted corresponds to an intersection of the spine and a respective radius;

In a subsequent step, the motion analysis parameters are saved s4h.

If desired, a result video is created using the result image files.

The software may provide a user with different options to:
- Capture switch motion and measure the motion for an isolated video or;
- Capture several switch videos and then analyse the videos afterwards.

Figure 5:
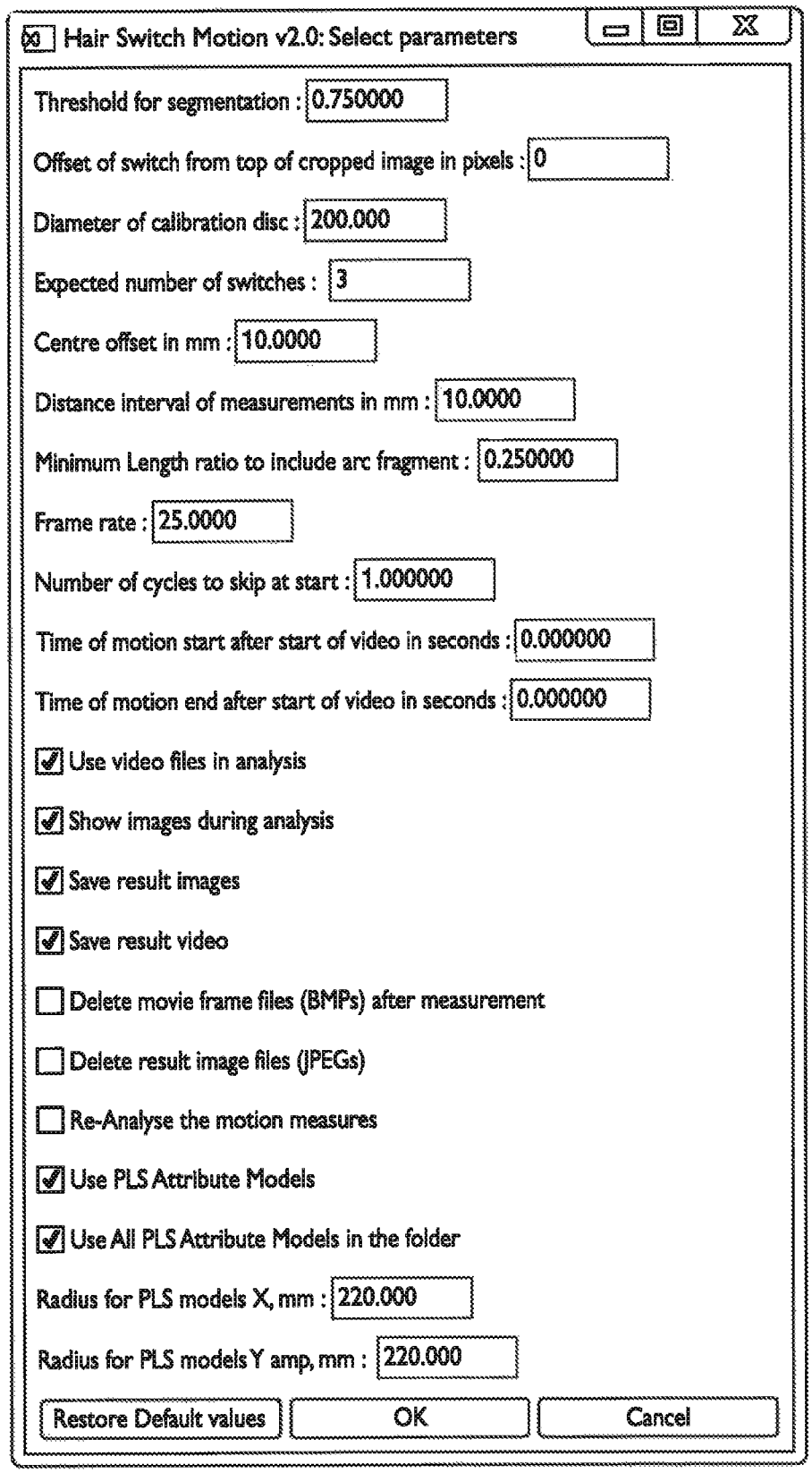
FIG. 5 depicts an example of a user input for measurement and analysis process carried out to obtain quantitative measurements from the images captured by the apparatus of the present disclosure.

FIG. 5 depicts an example of a user input interface for a measurement and analysis process carried out to obtain quantitative measurements from images captured by the apparatus of the present disclosure. In this example, the measurement and analysis process includes the following steps:

1. Defining parameters in User input Interface dialog box (example shown in FIG. 5):
   1.1. Entering the Factor used to segment the lightbox region and the switches, (In the example of FIG. 5, the value for threshold for segmentation=0.75);
   1.2. Entering the offset of the Top of the switch in pixels (Offset pixels) from the top of the cropped image, (In the example of FIG. 5, the value for offset=0 (pixels));
   1.3. Entering the Calibration disc diameter value (in the example of FIG. 5, the value for calibration disc diameter value=200.0 (Units='mm'))
   1.4. Entering the Number of switches expected in the video/image sequence,
   1.5. Entering the Distance of the motion origin above the top of the cropped image, (In the example of FIG. 5, the value for this distance, the centre offset=10.0 (mm));
   1.6. Entering the distance interval for the measurements along each switch, (In the example of FIG. 5, the value for distance interval (radii separation)=10.0 (mm));
   1.7. Entering the video frame rate, in frames per second, (In the example of FIG. 5, the value for frame rate=25.0);
   1.8. Entering the minimum length ratio, MinRatio, which is used to ignore spurious flyaway hair and thereby to improve the switch spine coordinates;

1.9. Entering the number of cycles to skip after motion start, Nc, which is used to define the start of Steady State (In the example of FIG. 5, the value for number of skip cycles=1.0);

1.10. Entering the Time of motion start and end (In the example of FIG. 5, the value for start and end time are both set to zero);

1.11. Checking the "Use video files in analysis"-box to use videos, uncheck for image sequences files;

2. Displaying and outputting options:

2.1. Checking the "Show images during analysis"-box to display result image during processing, uncheck not to display;

2.2. Checking the "Save result images"-box to save result images;

2.3. Checking the "Save result video"-box to save the result images into a video format.

2.4. Checking the "Delete movie frame files after measurement"-box to delete the image sequence created from the video. Image sequence may be deleted after measurement and analysis have been completed;

2.5. Checking the "Delete result image files" to remove result images after the result video has been created;

2.6. Checking the "Re-Analyse the motion measures"-box to reanalyse the measurement data. It may be useful to do this if the parameters affecting this analysis (Frame rate, number of cycles to skip, motion start and end times) are to be changed.

2.7. Checking the "Use PLS Attribute Models"-box in order to compute visual attributes from the motion measures;

2.8. Checking the "Use All PLS Attribute Models in the folder"-box, uncheck to select the desired attribute models files;

2.9. Setting the radius used in the PLS model for the horizontal, X, parameters, in mm;

2.10. Setting the radius used in the PLS model for the vertical, Y, parameters, in mm;

3. Saving the user above defined parameters, which become the initial settings when the program is next run. The settings may also written to a text log file. The settings for any subsequent re-measurement to re-analysis may be appended. Each entry having the current date and time. This file will be in the folder containing the movies or within the image folder if re-analysing or measuring image sequence files;

4. Displaying a Status message dialog will appear with instructions or status information;

5. Defining the Background video or image file;

6. Defining the Calibration disc video or image file;

7. Defining the Hair switch video or image sequence. More than one video file can be selected to facilitate batch processing;

8. Converting videos to images

9. Finding the crop coordinates (Top, Bottom, Left and Right) using background image and procedure (the crop coordinates corresponding to the region of the lightbox);

10. Measuring the calibration disc;

11. Measuring the image sequence;

12. Defining image times=Image number/frame rate;

13. Saving results;

14. Analysing the switch motion;

15. Calculating the Y position amplitudes of the spine intersection with the radius for each radius and for each switch 16. If PLS visual attribute model is selected then computing the attribute values;

17. Calculating and saving Hair and Filled volume statistics, including any graphs produced by the analysis software;

18. Storing steady-state and motion decay parameters

19. Storing width statistics:

20. Displaying the results;

21. Creating result video from results;

It will of course be appreciated that the method described above, and the user interface shown in FIG. 5, are provided as examples only.

Figure 6:
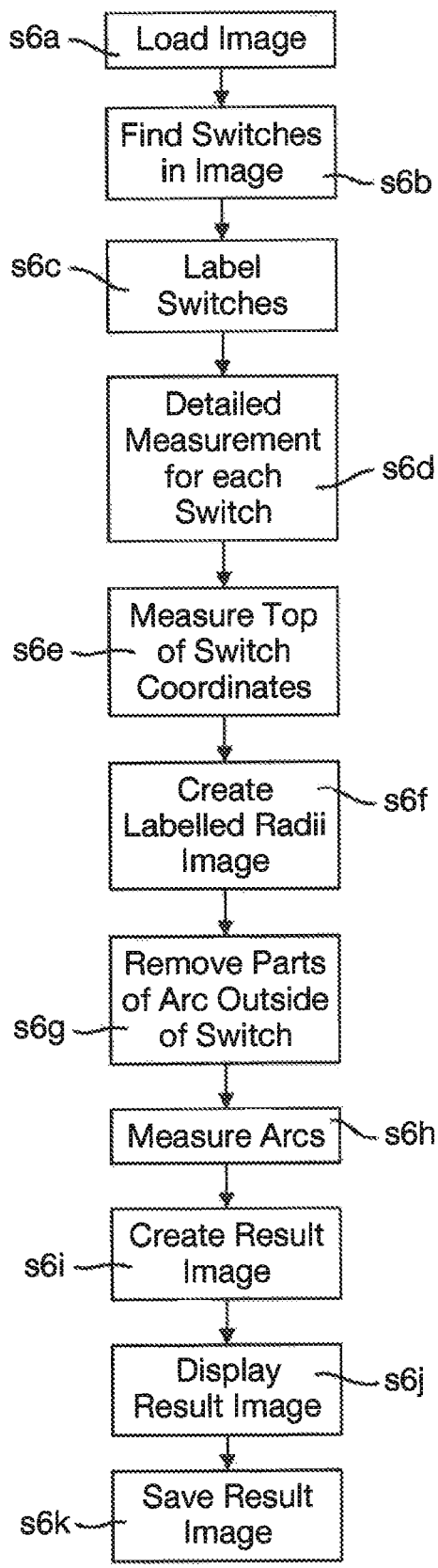
FIG. 6 depicts an example of analysis carried out on the images captured for a given switch.

FIG. 6 describes an example of the detailed analysis steps which may be carried out on the images captured for a given set of switches.

The following steps are carried out by motion analysis software, which loops through each of the images captured, preforming the steps on each image (unless otherwise stated):

Loading the image s6a;

Finding the switches in the loaded image s6b;

Labelling the switches present in the image s6c, setting up respective image region for each switch;

Carrying out the following detailed analysis s6d for each switch in the image:

Measuring the top of switch coordinates s6e;

If first image and first switch, creating a labelled radii image s6f;

Shifting the radii image to a horizontal position of the switch;

Removing parts of arcs outside of the switch;

Measuring the arcs (e.g. in mm) s6h, including:

Counting the number of arc fragment:

If only 1 arc fragment, then measuring the centre of gravity X & Y coordinates of the arc;

If more than 1 arc fragment, then computing the total length of all the fragments; Keep the largest fragment and removing any other fragments having a fragment length FragLen, where FragLen/TotalLen<MinRatio. Computing the Centre of Gravity coordinate of the remaining arc fragments. Saving as Xpos and Ypos;

Determining left edge X & Y coordinates and right Edge X & Y coordinates,

Determining centre of gravity X & Y coordinates;

Measuring switch areas and the filled areas, which includes the gaps between the separate fibre bundles.

Creating a result image if requested s6i.

Displaying the result image if requested;

Saving the result image if requested.

Figure 7:
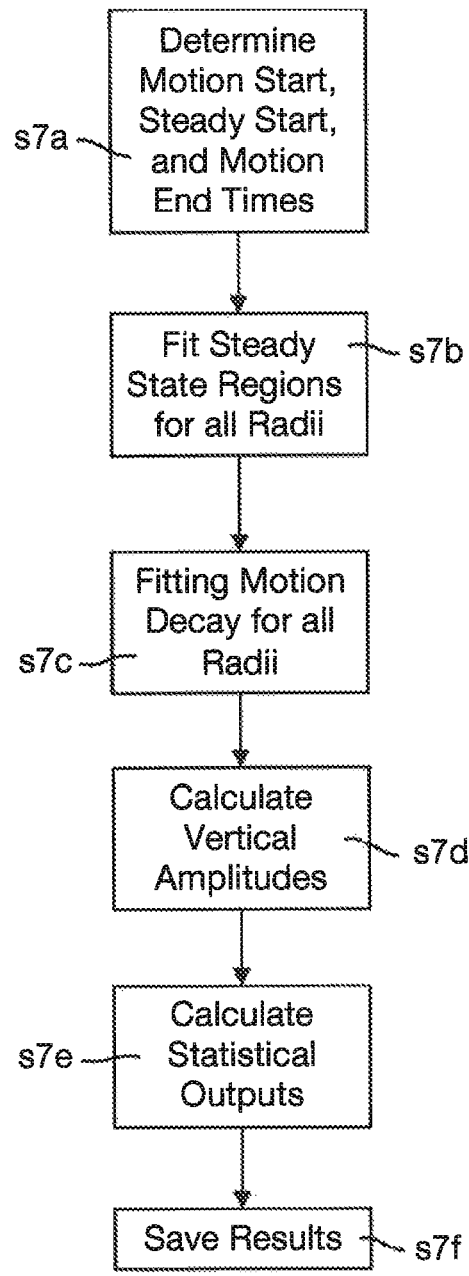
FIG. 7 depicts further analysis processes carried out on the data from the captured images.

FIG. 7 depicts an example of further analysis processes carried out at the processor on the data from the captured images to track measurement parameters as a function of time during a stationary phase, steady state (forced oscillation) phase, and a decay phase. In this example, the software on the processor causes the processor to carry out the following steps:

Determining Motion start, Steady State start and Motion end times, s7a;

Fitting steady-state regions for all radii, s7b;

Fitting Motion Decay for all radii, s7c;

Calculating vertical amplitudes, s7d;

Calculating statistical outputs s7e, which may include: the mean, min, max and standard deviations of the width measures, ArcLength and Width (FeretMax of arc) within the Stationary phase, the Steady State phase and the last quarter of the decay phase; and Storing data files and/or other files s7f.

The result of the analysis may include:
Results images, as shown in FIG. 10A, FIG. 10B, FIG. 11A and FIG. 11B;
quantitative measurements of hair switches;
Graphs, such as those shown in FIG. 12A, FIG. 12B, FIG. 12C, FIG. 13, FIG. 14, FIG. 15A, FIG. 15B and FIG. 15C.
one or more of the following parameters at each radius for each time point in the video for each switch:
Arc Length, which is the hair width not including voids;
Centre of Gravity X coordinates (horizontal) in mm;
Centre of Gravity Y coordinates (vertical) in mm;
Switch Width in mm, which includes voids;
X left Coordinates in mm;
Y left Coordinates in mm;
X right Coordinates in mm;
Y right Coordinates in mm;
X Position Coordinates in mm, the hair spine coordinates; and
Y Position Coordinates in mm, the hair spine coordinates;

Width and Arc Length statistics may also be calculated, giving Mean, Minimum, Maximum and Standard deviation values of the width parameter for the stationary phase, the Steady State phase and the last quarter of the Decay phase, for each switch.

"Hair volume" measures of Hair Area and Filled Area may be calculated for all switches, for each video and each switch, giving for example:
1. Switch Hair Volume (area) in $mm^2$ at the first time point;
2. Switch Hair Volume at the last time point;
3. Minimum of the Switch Hair Volume within the Steady State phase;
4. Maximum of the Switch Hair Volume within the Steady State phase;
5. Mean of the Switch Hair Volume within the Steady State phase;
6. Amplitude of the Switch Hair Volume within the Steady State phase. The amplitude is the standard deviation multiplied by square root of 2;
7. As above but using the filled Volume (which includes any gaps in the hair switch); An example of Hair Volume data is shown graphically in each of FIG. 15A, FIG. 15B and FIG. 15C. An example of Arc Length and Width data is plotted in FIG. 16.

Figure 8:
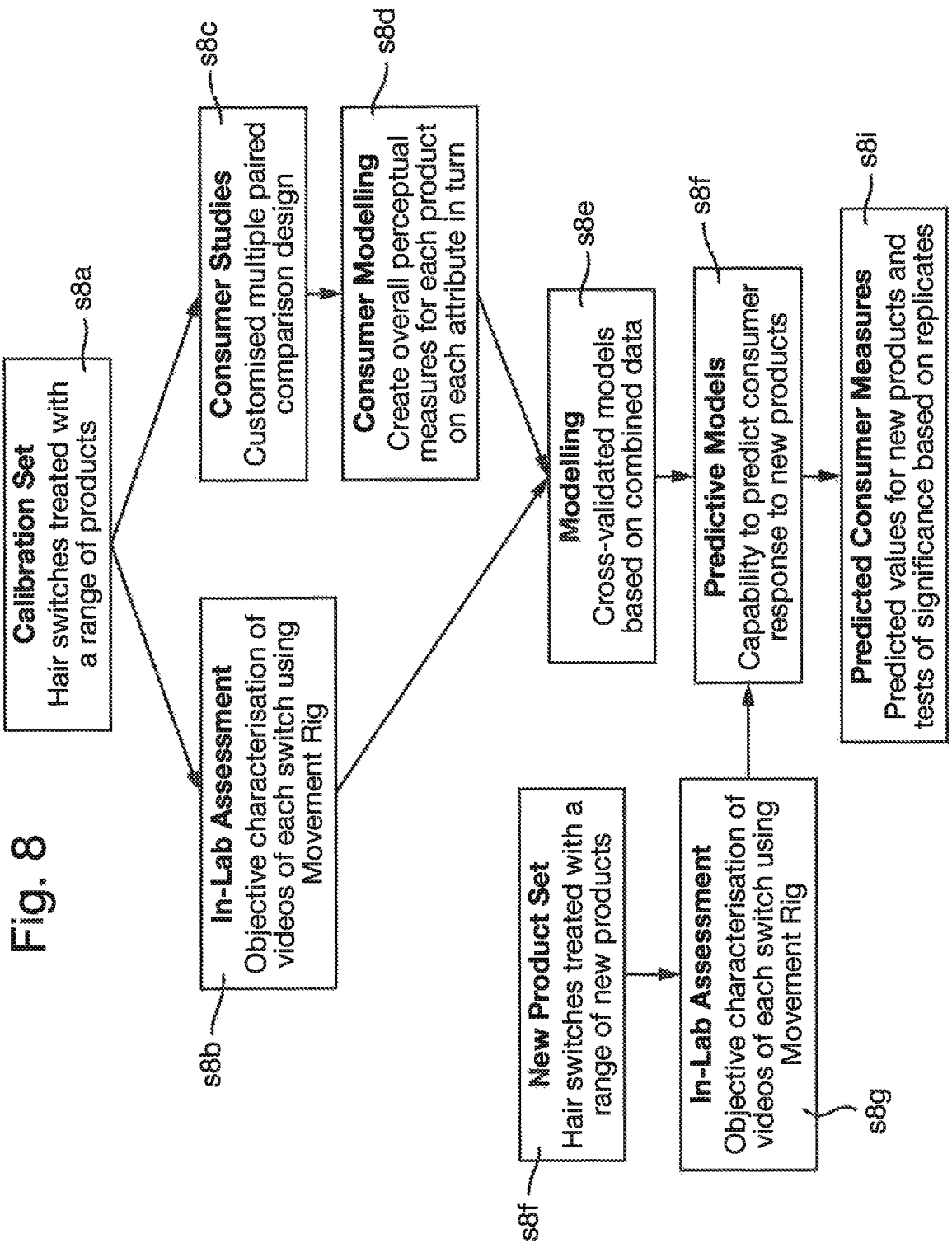
FIG. 8 depicts a calibration process carried out to match images taken using the movement rig with data for the same product set taken from consumer studies and output predictive measures for an unrelated product set.

A further embodiment incorporating consumer data is now described in relation to FIG. 8. In this embodiment, a calibration-type process is carried out to match images taken using the movement rig with data for the same product set taken from consumer studies and thereby produce output predictive measures for an unrelated product set, sometimes referred to as "validation products".

In this embodiment, the computer 4 will comprise an input for receiving raw consumer data and/or processed consumer modelled data based upon the consumer studies carried out using the hair switch(es), either via the interface 5 or otherwise.

In an initial step, s8a a calibration set of hair switches are produced, with different hair switches having been treated by different hair products.

In a subsequent step s8b, the hair switches are mounted in the movement rig 2 of the apparatus 1 and images obtained using the camera 3. The processor of the computer 4 carries out measurements and analysis of this "lab data" obtained using the apparatus according to any one or more of the methods previously described.

Separately, consumer studies are carried out s8c in which consumers provide their views on various aspects of hair movement of the same (treated) hair switches. The consumer results may be obtained by looking the switches two at a time. By analysing in pairs, the consumers can more easily provide useful responses in relation to whether a movement attribute is higher or lower for one given switch over another.

The consumer data is then modelled s8d using an algorithm which may or may not be performed on the computer 4. This modelling step creates an overall consumer perception value "d prime" ("d'") for each product and for each movement attribute of interest—this is the consumer modelled data. It will be appreciated that there are a number suitable models for generating the consumer modelled data. For example, the algorithm may apply a Thurstonian model to the consumer perception of relative differences between the two or more hair switches to derive the consumer modelled data (which includes the consumer perception values, d').

In a further modelling step s8e, upon receiving consumer modelled data, the processor generates a cross-validated model which combines the quantitative measurements of the hair switches from the captured images with the consumer modelled data. It will be appreciated that there are a number suitable models for the cross validated model, which generally corresponds to a correlation between the consumer modelled data and the quantitative measurements. One example of a cross-validated model is a partial least squares (PLS) model which correlates the quantitative measurements from the captured images with the consumer perception values (d') extracted from the consumer modelled data.

A predictive model can then be created s8f from the cross-validated model. This predictive model uses the known relationship between lab data and consumer data, as evaluated by the cross-validated model, to predict consumer responses for new "lab data" s8g from a new product set s8h of hair switches. The output of the predictive model s8f is therefore predictive consumer measures s8i, which include predicted consumer perception values for the new products.

The steps carried out by the software algorithms in order to compute the visual attributes (i.e. the predicted consumer response) are described in more detail below:

Initially, the Partial Least Squares (PLS) models must be used to calculate the measures, which predict visual attribute scores. The measures typically used are:
1. X position amplitude in the Steady State phase at the radius defined in the user interface, (PlsRadius);
2. Relative Phase Angle in degrees (=PhaseAngle[PlsRadius]—PhaseAngle[0]);
3. Decay Time constant (at PlsRadius);
4. Oscillations per minute (=60/Decay Wavelength);
5. Y position amplitude (at PlsRadiusY).

The measures are computed for each switch in the video file.

One predictive model, may include a number of attribute models, each attribute model corresponding to a hair attribute.

In the example of a PLS model, a particular attribute model may include a Description containing 'Switch Movement Measures' to specify that the model uses the defined motion parameters, since PLS models can be created for other method measures. A particular PLS attribute model may include a data structure PLS, in which:

1. PLS.Name : gives the attribute name, such as Fluid Movement;
2. PLS.Measures: gives the names of the measures (Intercept, X Amplitude (mm), Relative Phase [°], Decay Time (s), Oscillations/min, Y Amplitude (mm));
3. PLS.Offsets: is the Intercept value;
4. PLS.Wts: are the measure weights.

In the PLS model example, the resulting visual attributes values may be described by the following relationship:

$$A = C + \sum_{1}^{5} W_i \, M_i$$

Where:
A=predicted Visual Attribute value;
C=Offset or Intercept;
$W_i$=Measure weighting factor, PLS.Wts[i];
$M_i$=Vector of Measures in the order defined above in PLS.Measures.

The predicted visual attribute value corresponds to a predicted value for the visual attribute that was used to build the consumer modelled data, which was, in turn, used to generate the consumer validated model, which was, in turn, used to generate the predictive model. For example, if the consumer modelled data is based upon consumer comparisons, and consequently the consumer modelled data comprises d' values, then A corresponds to a predicted d' value for that particular visual attribute. For a second example, if the consumer modelled data is based upon consumers having scored the hair switches on a scale of 0-10 for a particular attribute, then the A value will be on a similar visual attribute scale of 0-10.

Examples of typical results will now be described with reference to FIGS. 9-16.

Figure 9:
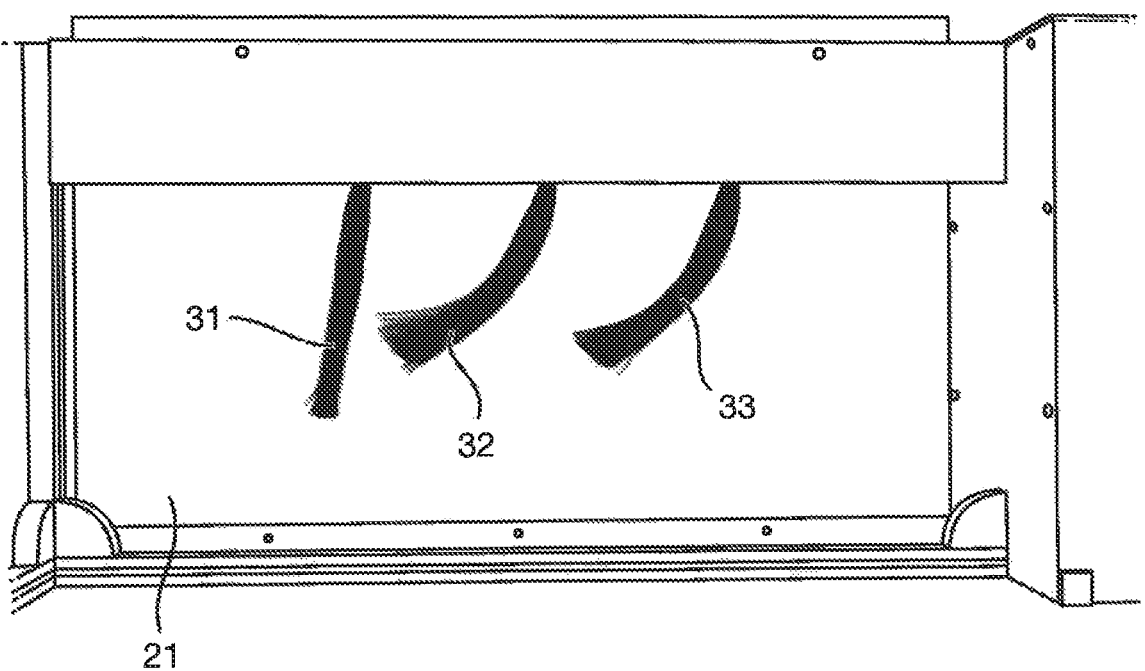
FIG. 9 depicts an example of three hair switches in the movement rig.

FIG. 9 shows a raw image of three hair switches mounted in the movement rig 2 of the apparatus 1. In this image, the three switches are undergoing forced oscillation. The left 31 and the right 33 hair switches are dark brown in colour and the middle switch 32 is bleached. However, it can be seen that the light box 21 facilitates imaging of the bleached switch. This image has been extracted from a video.

Figure 11A:
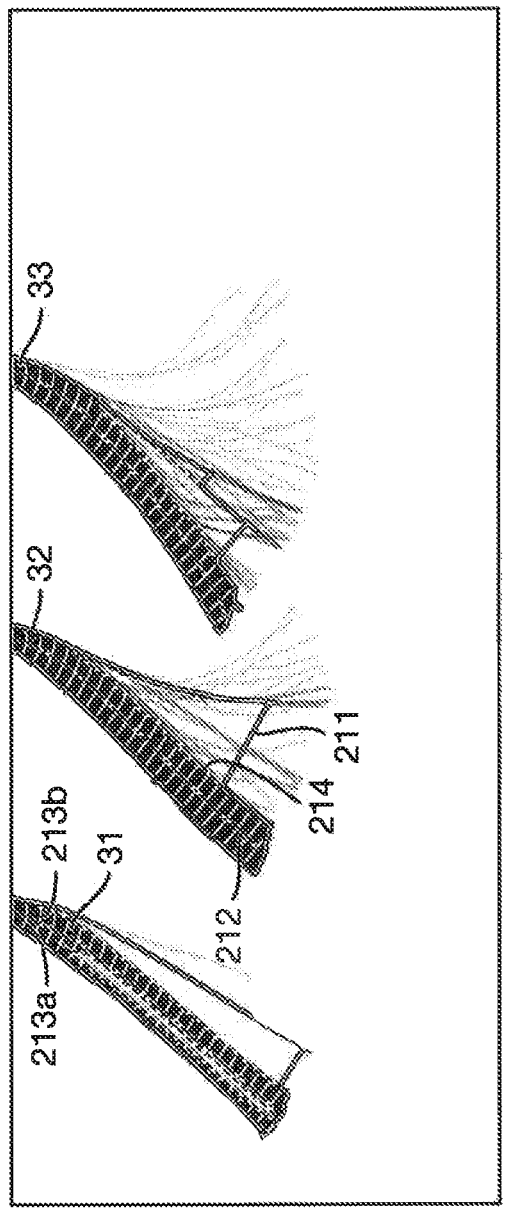
FIG. 11A and 11B show two further examples of image analysis carried out on the three hair switches of FIG. 9, including filtering of flyaway hairs.
Figure 11B:
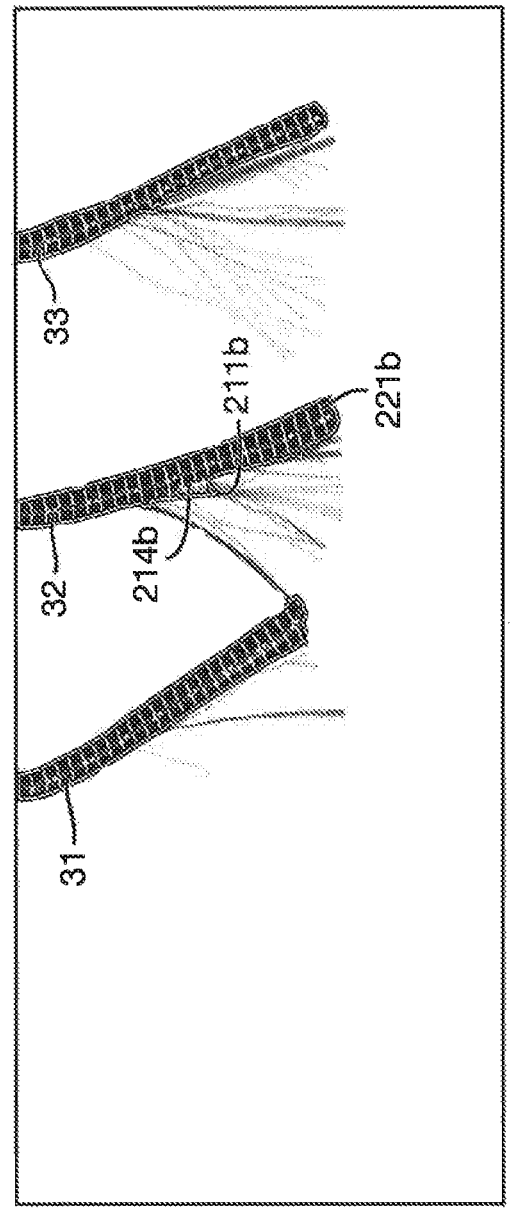

FIG. 10A is a result image, corresponding to the raw image of FIG. 9 after initial processing steps have taken place. Other (processed) results images are shown in FIGS. 10B, 11A and 11B. These images are cropped when loaded by the software using coordinates determined from the background image.

The results images of FIGS. 10A, 10B, 11A, 11B show the switch Hair outline 111, Filled Hair outline 114, switch spines 112 and the measurement radii 113a, 113b (10 mm radial spacing).

The left hair switch 31 can be seen to have separated in FIG. 10B, whereas the left hair switch 31 forms a single body in FIG. 10A. The filled switch area outline 114 for switch 31 in FIG. 10A therefore differs from the switch hair outline 114b for switch 31 in FIG. 10B, in that the filled switch area outline 114b shown in FIG. 10B extends up the split, whereas the switch hair outline 114 shown in FIG. 10A does not extend up the split.

FIGS. 11A and 11B show the three hair switches of the previous figures, each of which illustrate an improved segmentation method between the switches.

FIG. 11A shows a result image in which the stray fibres have been at least partially ignored by a filter. In other words, in FIG. 11A, it can be seen that the analysis algorithm has excluded portions of the stray fibres, which has resulted in both the switch area outline 214 and the switch hair outline 211 following more closely an outer profile of the hair switch that is partially defined by the stray fibres, rather than by the main body of the hair switch. Without the filter, the switch spine edge location may be displaced erroneously in the direction of the flyaways (i.e. too far to the right in FIG. 11A).

In FIG. 11B, the stray fibres have been ignored by the measurement and analysis algorithms, leading to a more accurate placement of the switch spine, and therefore more accurate outputs for any measurements which are calculated using the spine switch.

FIG. 11B also incorporates an improved switch segmentation method coping with touching switches (in this case flyaways from the middle hair switch 32 which are touching the main body of the left switch 31).

The switch segmentation is performed by a routine including the following general steps:
Calculating the mean intensity of the light box region in the image, referred to as "WhiteGrey". Pixels corresponding to hair switches are identified as Switch pixels
Switch pixels are those with, Image pixel value< (WhiteGrey* ThreshFactor). An example, value for ThreshFactor is 0.75, but this can be changed according to the specific scenario;
Removing small objects (for example, those with a size of less than<100 pixels) from Switches;
Removing artefacts, which comprises
Measuring the objects in Switches and copy each object to image Specimen provided that the object center of gravity y value, CgY>MinValue AND CgY<MaxValue AND Top of object>TopY. Count the number of objects in Specimen, which is referred to as NumSwitches.
If NumSwitches<ExpectedNumSwitches Then Erode the objects until the number of objects, NumSwitches=ExpectedNumSwitches;
If NumSwitches >ExpectedNumSwitches Then retain the NumSwitches largest objects.

The switch segmentation process may also include a routine to cope with hair switches touching the edges of an image.

Figure 12A:
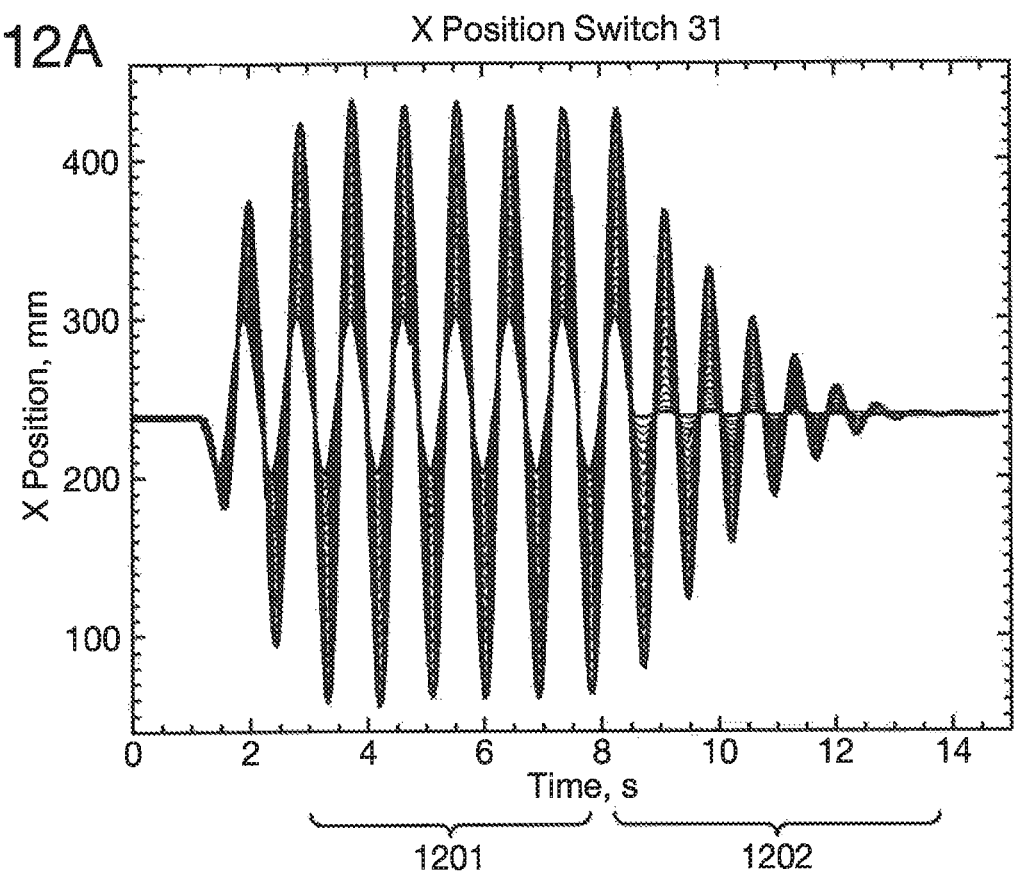
FIG. 12A, 12B and 12C show horizontal position data for the first, second and third switches of FIG. 9 respectively.
Figure 12B:
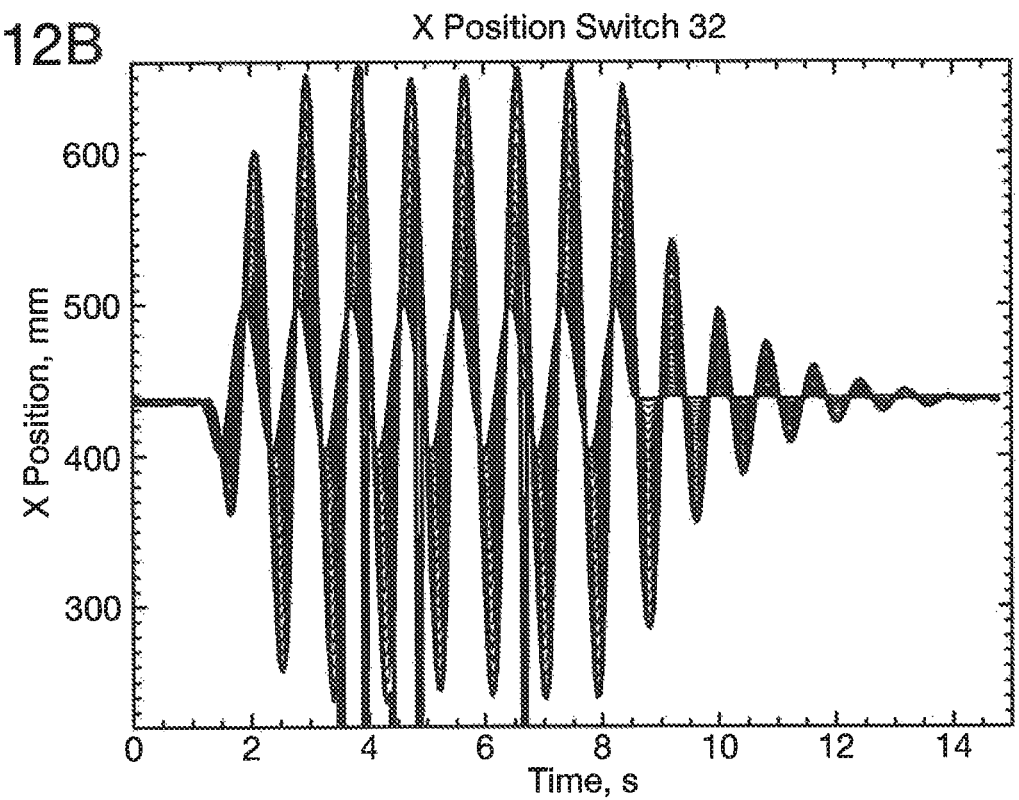
Figure 12C:
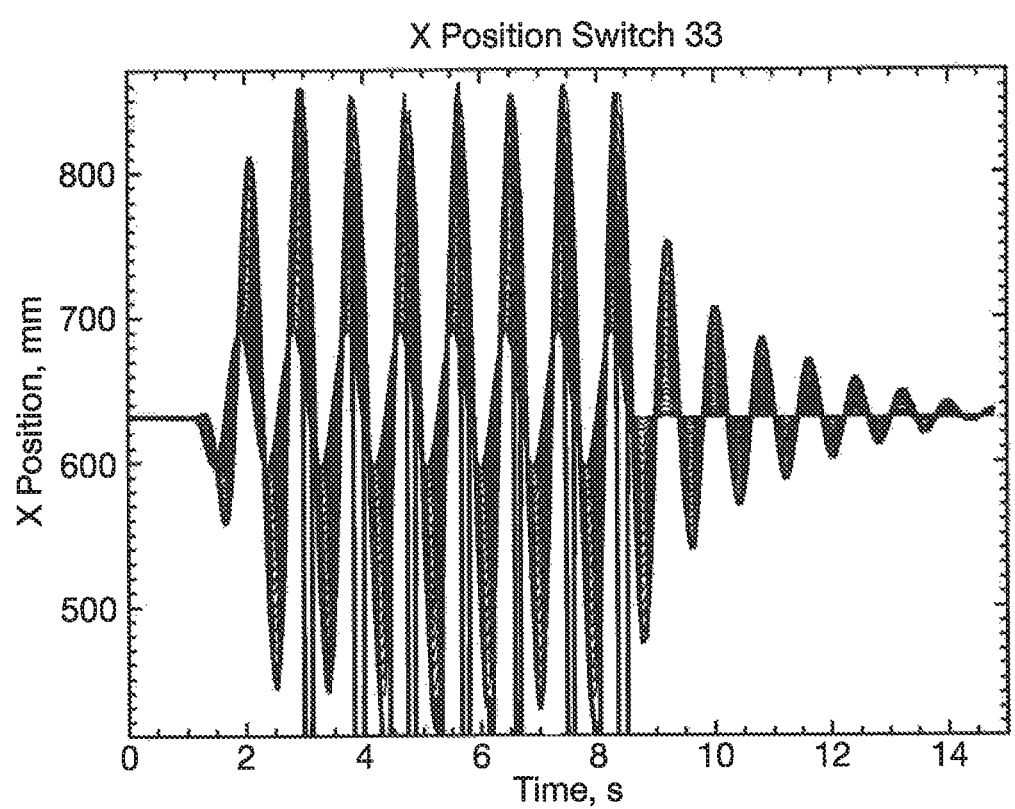

FIG. 12A, FIG. 12B and FIG. 12C show the switch motion data for the three hair switches 31, 32 and 33 of as shown in previous FIGS. 10A, 10B, 11A, and 11B. The hair switches are colour coded as a function of arc radius.

In more detail, FIG. 12A: shows the horizontal position data for the first switch 31, for all radii 0 to 240 mm, shaded (originally colour coded) by radius. The graph shows the period of motion with steady state region 1201 at which the hair switch undergoes forced oscillation, as well as the decay region 1202 which shows the movement of the hair switch once the forced oscillation has been removed.

FIG. 12B shows the corresponding horizontal position data for the second switch 32, again for radii 0 to 240 mm. FIG. 12C shows the corresponding horizontal position data for the third switch 33 for radii 0 to 240 mm.

Figure 13:
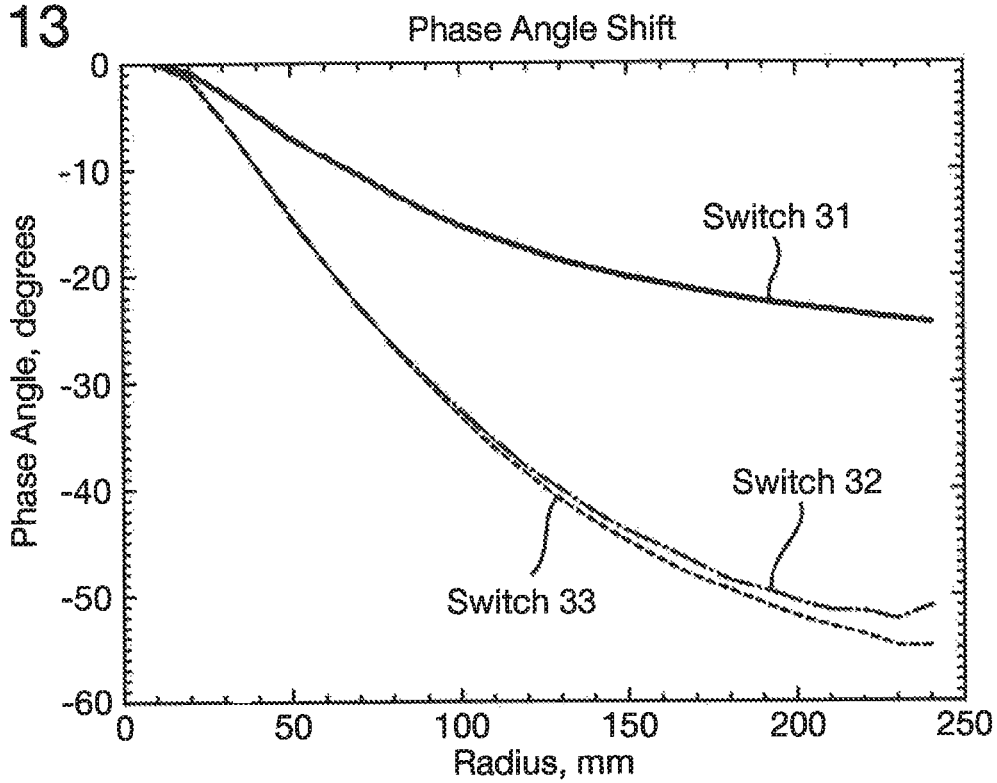
FIG. 13 shows the steady state phase angle as a function of radius for the three switches of FIG. 9.

The steady state phase lag shown in these graphs can be better understood with reference to FIG. 13, which shows Steady-State Phase Angle relative to the forced oscillation.

Figure 14:
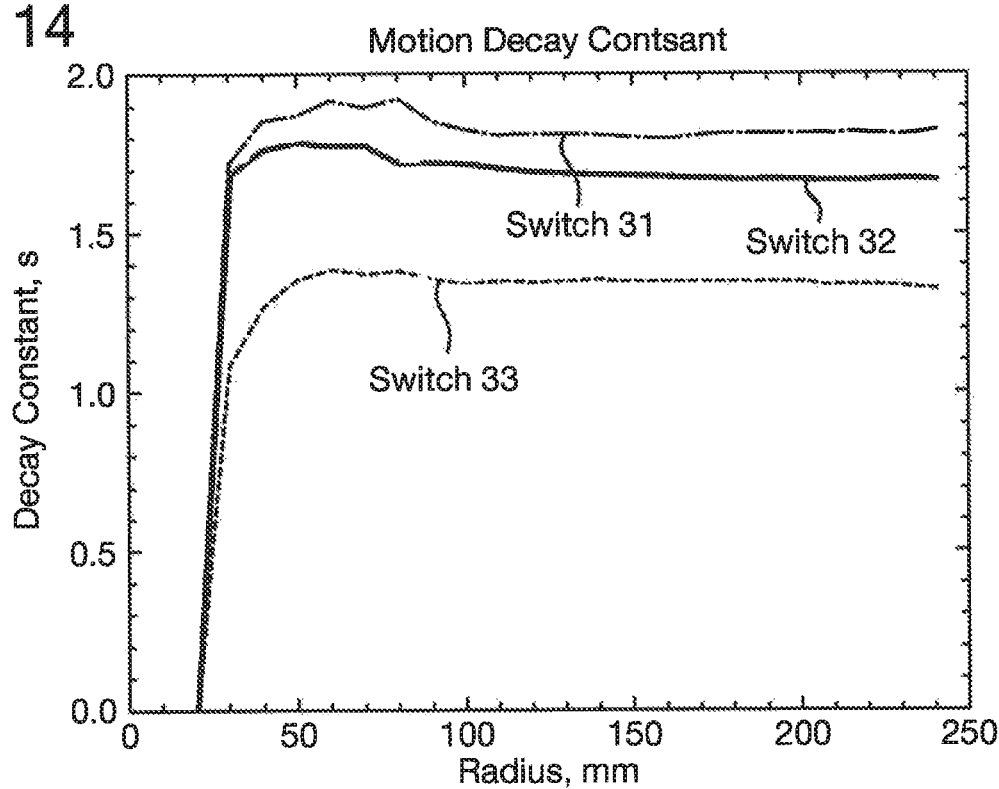
FIG. 14 shows the motion decay constant as a function of radius for each of the three switches of FIG. 9.

The motion decay time constant is shown in FIG. 14. The switch motion amplitude is dependent on how close the forced oscillation frequency is to the natural frequency of the switch. The motion decay frequency is therefore a good measure of the switch's natural frequency.

Figure 15A:
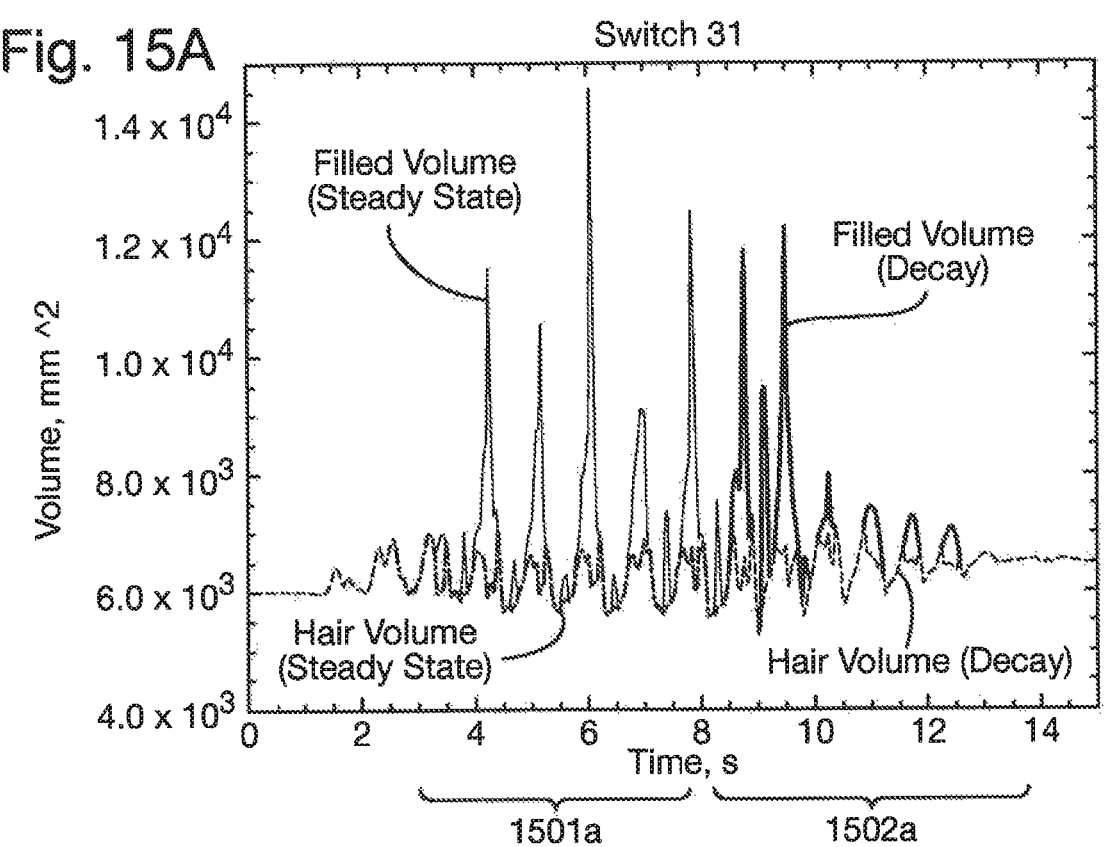
FIG. 15A, 15B and 15C show the volume time profiles (2D volume profiles) of the three switches of FIG. 9 respectively.
Figure 15B:
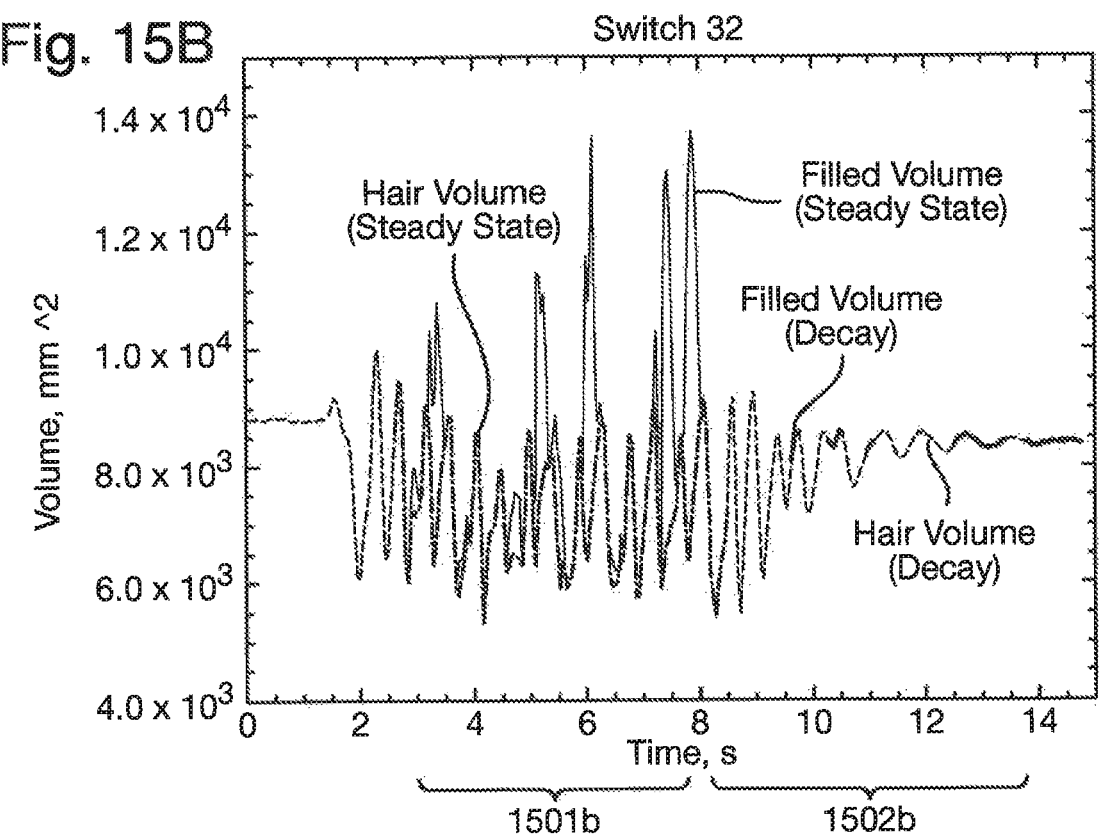
Figure 15C:
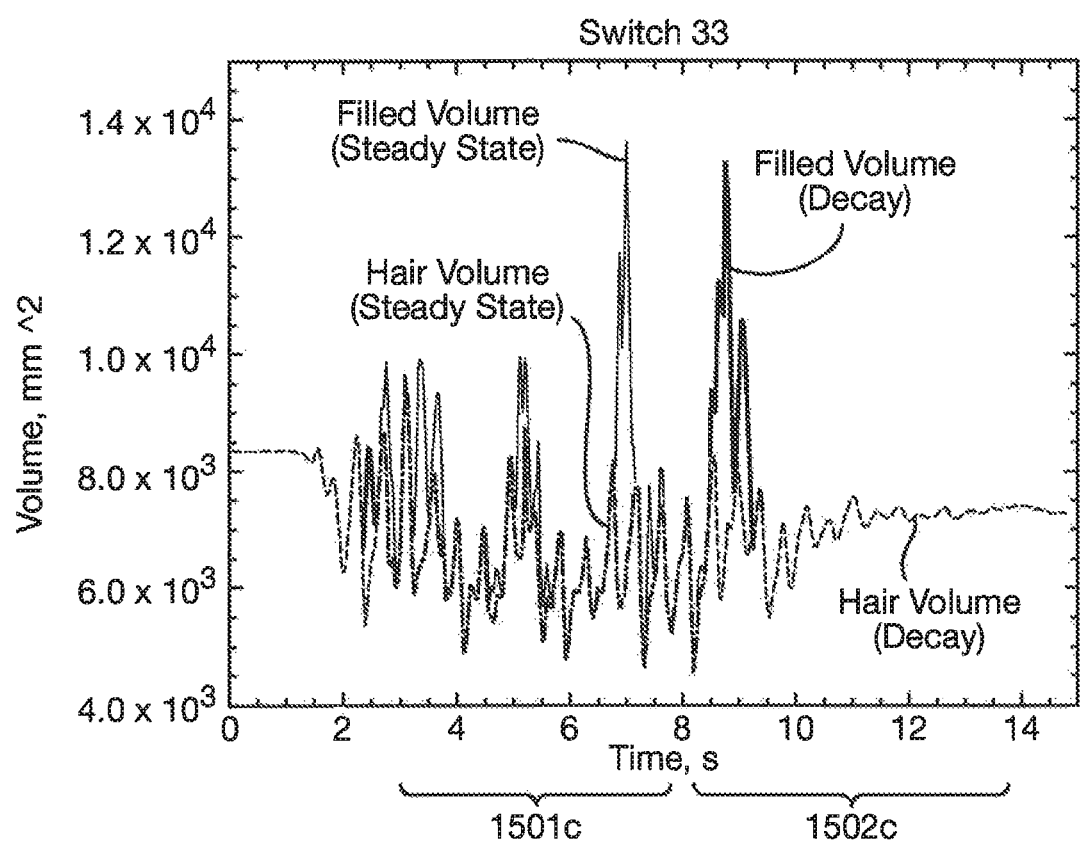

FIG. 15A, 15B and 15C show the volume time profiles (2D area profiles) of the three switches 31, 32, 33 of the previous Figs. respectively. The differences between the steady state region 1501a and the decay state region 1502a can be clearly seen, as well as the differences between the hair volume and the filled volume. Filled volumes (i.e. filled 2D areas in the captured images) include the gaps between separate fibre bundles within a given switch.

Note that for the first switch 31 (FIG. 15A), the final volume is greater than the starting volume; whereas, for the second and third hair switches 32, 33 (FIGS. 15B, and 15C, respectively) the final volume is less than the starting volume (for both the hair volume value and also the filled volume value).

FIG. 16 shows an example of arc length and switch width as a function of time for a single switch at a radii of 170 mm. Where arc length is the total hair width excluding voids, and Width is the overall width including voids.

Figure 17:
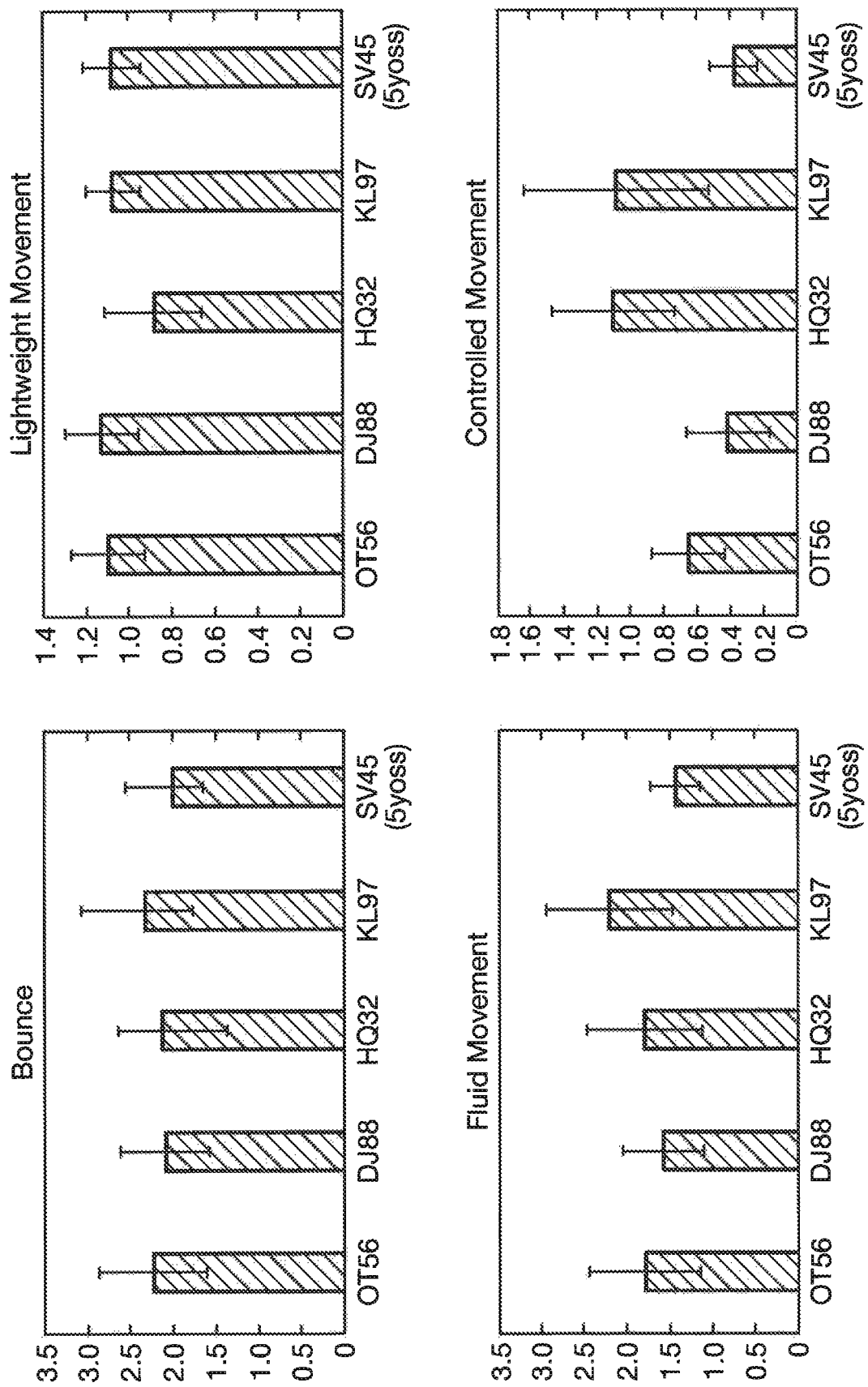
FIG. 17 shows an example of data taken from a consumer studies group relating to four different attributes of hair type for 5 hair switches, each hair switch treated by a different product.

FIG. 17 shows an example of data taken from a consumer studies group relating to four different attributes of hair type for 5 hair switches, each hair switch treated by a different product (labelled OT56, DJ88, HQ32, KL97 and SV45 (Syoss)). The four attributes that were perceived by the consumers were: bounce, fluid movement, controlled movement, and lightweight movement. The graphs in FIG. 17 show results obtained by using a consumer data model that analyses the attributes from a study in which the consumers were asked to give preferences whilst looking at, and comparing, different combinations of pairs of switches.

While the present disclosure has been described in conjunction with the exemplary embodiments described above, many equivalent modifications and variations will be apparent to those skilled in the art when given the present disclosure. Accordingly, the exemplary embodiments of the present disclosure set forth above are considered to be illustrative and not limiting. Various changes to the described embodiments may be made without departing from the spirit and scope of the present disclosure.

All references referred to above are hereby incorporated by reference.

The invention claimed is:

1. An apparatus for measuring movement characteristics of a first hair switch, the apparatus comprising:
   a movement rig upon which the first hair switch is mountable, the movement rig operable to apply a forced oscillation to the first hair switch;
   a camera for capturing images of the first hair switch during movement of the first hair switch during and after application of the forced oscillation; and
   a computer communicably connected to the camera, the computer including a processor for processing the images and extracting quantitative measurements of the first hair switch from the images,
   characterised in that a filter is applied to the images to remove any stray hairs detected before subsequent analysis of the images is carried out and wherein the computer comprises an input for receiving consumer modelled data based upon consumer studies carried out using the first hair switch.

2. The apparatus of claim 1, wherein the movement rig is configured to facilitate mounting of a second hair switch to the movement rig while the first hair switch is mounted to the movement rig, the movement rig further configured to apply the forced oscillation to the first hair switch and the second hair switch.

3. The apparatus of claim 1, wherein the quantitative measurements comprise at least one of: x amplitude; y amplitude; phase between the a top of the first haft switch and a bottom of the first hair switch; decay time; natural frequency; 2D area of the first hair switch, or; change on 2D area before, during, and after movement of the first hair switch.

4. The apparatus of claim 1, wherein the consumer modelled data is a consumer perception value, d prime (d'), calculated by applying a Thurstonian model to consumer perception of relative differences between two or more hair switches.

5. The apparatus of claim 1, wherein, upon receiving the consumer modelled data, the processor applies a cross-validated model which combines the quantitative measurements with the consumer modelled data.

6. The apparatus of claim 5, wherein the cross-validated model is a partial least squares model which correlates the quantitative measurements with the consumer perception values extracted from the consumer modelled data.

7. The apparatus of claim 5, wherein the processor is further configured to apply a predictive model based upon the cross-validated model to new sets of hair switches to take in lab measurements of the new sets of hair switches and predict consumer responses based upon the cross-validated model.

8. A method of measuring movement characteristics of a hair switch, the method comprising:
   providing a movement rig upon which the hair switch is mountable, the movement rig operable to apply a forced oscillation to the hair switch;
   providing a camera for capturing images of the hair switch during movement of the hair switch during and after application of the forced oscillation;
   providing a computer communicably connected to the camera, the computer including a processor;
   processing the images using the processor; extracting quantitative measurements of the hair switch from the images; and
   applying, before at least one of processing the images using the processor or extracting the quantitative measurements, a filter to the images to remove any stray hairs, and receiving at an input of the computer, consumer modelled data based upon consumer studies carried out using the hair switch.

9. The method of claim 8 wherein, upon receiving the consumer modelled data, the processor applies a cross-validated model which combines the quantitative measurements of the hair switch with the consumer modelled data.

10. The method of claim 9, wherein the cross-validated model is a partial least squares model which correlates the quantitative measurements with consumer perception values extracted from the consumer modelled data.

11. The method of claim 9, further comprising applying a predictive model based upon the cross-validated model to quantitative measurements taken from new sets of hair switches, the predictive model predicting consumer responses to the new sets of hair switches based upon the cross- validated model.

12. A non-transitory computer readable media having computer-executable instructions embodied therein that, when executed by a processor of a computer having an input for consumer modelled data based upon consumer studies carried out using the hair switch, cause the computer to perform operations comprising:

causing a camera to capture a first image of the hair switch while causing the movement rig to apply the forced oscillation;

causing the camera to capture a second image of the hair switch after causing the movement rig to apply the forced oscillation;

applying a first filter to the first image, thereby creating a first filtered image;

extracting a first set of quantitative measurements from the first filtered image;

applying a second filter to the second image, thereby creating a second filtered image;

extracting a second set of quantitative measurements from the second filtered image.

13. The computer readable media of claim 12, wherein the first filter is the same as the second filter.

\* \* \* \* \*